United States Patent
Wake et al.

(10) Patent No.: US 6,553,068 B1
(45) Date of Patent: Apr. 22, 2003

(54) VIDEO SIGNAL CODING METHOD AND DEVICE ADAPTED TO CONTROL CODE AMOUNTS ACCORDING TO THE CHARACTERISTICS OF PICTURES

(75) Inventors: Kazuhiro Wake, Moriguchi (JP); Masakazu Nishino, Kashiwara (JP); Yuji Fujiwara, Nishinomiya (JP); Seiichi Takeuchi, Neyagawa (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/180,447

(22) PCT Filed: Mar. 10, 1998

(86) PCT No.: PCT/JP98/00967

§ 371 (c)(1),
(2), (4) Date: Nov. 5, 1998

(87) PCT Pub. No.: WO98/41027

PCT Pub. Date: Sep. 17, 1998

(30) Foreign Application Priority Data

Mar. 12, 1997 (JP) .............................................. 9-057284
Jun. 6, 1997 (JP) .............................................. 9-148888

(51) Int. Cl.⁷ ................................................. H04N 7/12
(52) U.S. Cl. ............................................... 375/240.14
(58) Field of Search ....................... 375/240.04, 240.14; H04N 7/12

(56) References Cited

U.S. PATENT DOCUMENTS 5,231,484 A  * 7/1993 Gonzales et al. ...... 375/240.04
5,442,401 A    8/1995 Murakami et al. .......... 348/405
5,517,583 A    5/1996 Horiuchi et al. ............ 382/239

FOREIGN PATENT DOCUMENTS

| EP | 0 618 733 A2 | 10/1994 |
| EP | 0 743 793 A2 | 11/1996 |
| EP | 0 759 678 A1 | 2/1997 |
| JP | 6-233285 | 8/1994 |
| JP | 6-276395 | 9/1994 |
| JP | 7-75095 | 3/1995 |

OTHER PUBLICATIONS

European Search Report dated Jul. 2, 2001, 3 pages.
Patent Abstracts of Japan, Publication No. 07075095, published Mar. 17, 1995.
Patent Abstracts of Japan, Publication No. 06276395A, published Sep. 30, 1994.
Patent Abstracts of Japan, publication No. 06233285A, publication date Aug. 19, 1994.

* cited by examiner

*Primary Examiner*—Young Lee
(74) *Attorney, Agent, or Firm*—Rosenthal & Osha L.L.P.

(57) ABSTRACT

A video signal coding device is provided with unit dividing means (202) for dividing an input picture into units each of which is a coding quantity control unit consisting of one or a plurality of frames to be processed by any one of intra-frame coding, inter-frame forward coding, and inter-frame bi-directional coding; activity calculating means (203) for calculating a frame activity for every frame of the input picture, and calculating a unit activity for every unit from the frame activities of frames belonging to the same unit; target coding quantity deciding means (205) for deciding a target coding quantity of a coding frame on the basis of the fame activity of the coding frame which is a coding object, the unit activity of a coding unit to which the coding unit belongs, and the average unit activity of a unit prior to the coding unit; and coding means (206) for coding the coding frame by the target coding quantity so as to generate coded data.

1 Claim, 14 Drawing Sheets

VIDEO SIGNAL CODING METHOD AND DEVICE ADAPTED TO CONTROL CODE AMOUNTS ACCORDING TO THE CHARACTERISTICS OF PICTURES

TECHNICAL FIELD

The present invention relates to a highly efficient coding method and apparatus used for recording or transmitting picture signals, and more particularly, to a code amount control system that reduces the total code amount of the whole picture to a predetermined value or less, while restraining the deterioration of picture quality.

BACKGROUND ART

An example of this type of picture signal coding method is an interframe coding system represented by MPEG (Moving Picture Experts Group). As code amount control in such a coding system, two types of code amount control, that is, (1) intra-GOP interframe code amount control for one GOP (Group of Pictures) and (2) intraframe inter-macro-block code amount control for one frame, are necessary.

In a TM5 system widely known as a test model of the MPEG, for the above (1) intra-GOP interframe code amount control, the target code amount for a coding frame is found from the activity of previously encoded frames and the remaining code amount. Here, the remaining code amount means a code amount obtained by subtracting the generated code amount of encoded frames from a code amount assigned to a GOP to which the coding frame belongs, that is, a code amount assigned to frames after the coding frame.

For the above (2) intraframe inter-macro-block code amount control, the quantization parameter for a coding macro block (hereinafter referred to as a scaling factor) is found from the relationship between the generated code amount up to the present time and the target code amount. This system is called a feedback system.

On the contrary, in a feedforward system, which is also well known for the intraframe inter-macro-block code amount control, a code amount is pre-calculated by using all available scaling factors (in the MPEG 2, 31 scaling factors can be used) and the scaling factor that is the closest to the target code amount among the obtained 31 code amounts is selected as the final scaling factor.

The scaling factor is a parameter used in quantization. One scaling factor is provided corresponding to one macro block. When the value of the scaling factor is small, the macro block is quantized in a smaller quantization step. On the contrary, when the value of the scaling factor is large, the macro block is quantized in a larger quantization step.

FIG. 16 shows a block diagram of a picture signal coding device using a conventional intra-GOP interframe code amount control system. In FIG. 16, 800 denotes a motion vector detection portion, 801 denotes a differential picture generation portion, 802 denotes an activity calculation portion, 803 denotes a target code amount determination portion, 804 denotes a coding portion, 805 denotes an assigned code amount updating portion, and 806 denotes a local decoder.

A picture signal is inputted to the motion vector detection portion 800 and the differential picture generation portion 801. When the inputted picture type is a P type or B type picture, the motion vector detection portion 800 detects motion vectors with respect to reference picture(s) stored in the memory and outputs the detected motion vectors. When the inputted picture is an I type picture, the motion vector detection portion 800 does not detect motion vectors. The motion vectors outputted from the motion vector detection portion 800 are inputted to the differential picture generation portion 801.

When the inputted picture type is a P type or B type picture, the differential picture generation portion 801 generates a predicted picture from the inputted motion vectors and decoded reference picture(s) inputted from the local decoder 806 and calculates the differences between the predicted picture and the inputted picture. The differential picture outputted from the differential picture generation portion 801 is inputted to the coding portion 804.

If there is a frame that is the same picture type in the previously encoded frames, the target code amount determination portion 803 determines a target code amount from the activity of the encoded frame and the remaining code amount. If there is no frame of the same picture type, the target code amount determination portion 803 sets a specific initial value as the target code amount. The target code amount is inputted to the coding portion 804.

The coding portion 804 encodes the inputted differential picture by the inputted target code amount and outputs encoded data and an average scaling factor. The encoded data is inputted to the activity calculation portion 802, the assigned code amount updating portion 805, and the local decoder 806. The average scaling factor is inputted to the activity calculation portion 802.

The activity calculation portion 802 calculates a generated code amount from the inputted encoded data, calculates an activity from the inputted average scaling factor and the calculated generated code amount, and updates the activity of the frame of the same picture type as the coding frame to the calculated activity.

The assigned code amount updating portion 805 calculates a generated code amount from the inputted encoded data and updates the assigned code amount. The local decoder 806 decodes the inputted encoded data and generates a decoded picture.

FIG. 17 shows a block diagram of the coding portion 804. In FIG. 17, 810 denotes a macro-blocking portion, 811 denotes an orthogonal transformation portion, 812 denotes a quantization portion, 813 denotes an importance calculation portion, 814 denotes a scaling factor determination portion, and 815 denotes a variable length coding portion. A conventional intraframe inter-macro-block code amount control system will be described with reference to this figure.

A differential picture inputted to the coding portion is inputted to the macro-blocking portion 810. The macro-blocking portion 810 performs the process of blocking and macro-blocking the inputted differential picture. The macro-blocked data is inputted to the orthogonal transformation portion 811 and the importance calculation portion 813.

The orthogonal transformation portion 811 performs orthogonal transformation for each block and outputs transformation coefficients. The transformation coefficients are inputted to the quantization portion 812. The importance calculation portion 813 calculates an importance for each macro block and outputs the importance data indicating the importance of the macro block.

The importance data is inputted to the scaling factor determination portion 814. The scaling factor determination portion 814 determines a scaling factor from the importance data of the coding macro block and the remaining code amount. Here, the remaining code amount means a code amount obtained by subtracting the sum of the generated code amounts of macro blocks previously encoded from the target code amount set for the frame, that is, a code amount assigned to the remaining macro blocks including the coding macro block.

The scaling factor outputted from the scaling factor determination portion 814 is inputted to the quantization portion 812. The quantization portion 812 quantizes the transformation coefficients provided from the orthogonal transformation portion 811 by the inputted scaling factor and outputs quantized data. The quantized data is inputted to the variable length coding portion 815.

The variable length coding portion 815 performs the variable length coding of the inputted quantized data and outputs encoded data. The encoded data is inputted to the scaling factor determination portion 814. The scaling factor determination portion 814 calculates the generated code amount of the encoded macro block based on the inputted encoded data and updates the remaining code amount.

FIG. 18 is a block diagram of another configuration of the conventional coding portion 804. In FIG. 18, 820 denotes a macro-blocking portion, 821 denotes an orthogonal transformation portion, 822 denotes a quantization portion, 823 denotes an importance calculation portion, 824 denotes a code amount calculation portion, 825 denotes a final scaling factor determination portion, and 826 denotes a variable length coding portion. A feedforward system, which is another intraframe inter-macro-block code amount control system, will be described with reference to FIG. 18. Only the coding portion will be described as in the above explanation with reference to FIG. 17.

A differential picture inputted to the coding portion is inputted to the macro-blocking portion 820. The macro-blocking portion 820 performs the process of blocking and macro-blocking the inputted differential picture. The macro-blocked data is inputted to the orthogonal transformation portion 821 and the importance calculation portion 823.

The orthogonal transformation portion 821 performs orthogonal transformation for each block and outputs transformation coefficients. The transformation coefficients are inputted to the quantization portion 822 and the code amount calculation portion 824. The importance calculation portion 823 calculates an importance for each macro block and outputs importance data indicating the importance of the macro block. The importance data is inputted to the code amount calculation portion 824 and the quantization portion 822.

The code amount calculation portion 824 has 31 code amount estimation portions. Each code amount estimation portion performs the quantization and variable length coding of the inputted transformation coefficients based on a specific scaling factor and a scaling factor generated from the importance data and calculates the generated code amount of one frame. The generated code amounts according to 31 scaling factors outputted from the code amount calculation portion 824 are inputted to the final scaling factor determination portion 825.

The final scaling factor determination portion 825 determines a scaling factor providing a generated code amount that is the closest to the target code amount of the coding frame among the inputted 31 generated code amounts as a final scaling factor and outputs the final scaling factor. The final scaling factor is inputted to the quantization portion 822.

The quantization portion 822 quantizes the macro block of the coding frame based on the inputted final scaling factor and importance data and outputs quantized data. The quantized data is inputted to the variable length coding portion 826. The variable length coding portion 826 performs the variable length coding of the inputted quantized data and outputs encoded data.

A problem of the conventional intra-GOP interframe code amount control systems as described above is that since the activity of the frames previously encoded is used to determine the target code amount of the coding frame, the assignment of the code amount does not reflect the characteristics of the picture of the coding frame. Furthermore, in the intraframe inter-macro-block code amount control system, the scaling factor used for the quantization of the coding macro block does not reflect the characteristics of the coding macro block sufficiently.

In addition, the conventional feedforward type intraframe inter-macro-block code amount control system enables control that takes into account the characteristics of the coding macro block, but this system requires a very large scale circuit and a very large number of operations.

SUMMARY OF THE INVENTION

A coding method according to the present invention is adapted to control code amounts with high precision according to the characteristics of pictures by improving first and second conventional coding methods as defined below.

The first conventional coding method comprises the steps of defining N continuous frames as one coding control unit, performing intraframe coding of a first frame of the coding control unit without using a difference between frames, coding an Nth frame using a difference between the Nth frame and the first frame, and coding a second frame to a (N−1)th frame using both difference between the second to the (N−1)th frame and the first frame and difference between the second to the (N−1)th frame and the Nth frame.

The second conventional coding method comprises the steps of defining N continuous frames as one coding control unit, performing intraframe coding of a Kth frame of the coding control unit without using a difference between frames, coding an Nth frame using a difference between the Nth frame and the Kth frame, coding a first frame to a (K−1)th frame using both difference between the first to the (K−1)th frame and the Nth frame of the latest previous coding control unit and difference between the first to the (K−1)th frame and the Kth frame of the current coding control unit, and coding a (K+1)th frame to a (N−1)th frame using both difference between the (K+1)th to the (N−1)th frame and the Kth frame of the current coding control unit and difference between the (K+1)th to the (N−1)th frame and the Nth frame of the current coding control unit, According to a first aspect of the coding method of the present invention, in the first conventional coding method, target code amounts of all frames of the coding control unit are set considering the difference between the Nth frame and the first frame as an index.

According to a second aspect of the coding method of the present invention, in the second conventional coding method, target code amounts of all frames of the current coding control unit are set considering the difference between the Nth frame and the Kth frame as an index.

According to a third aspect of the coding method of the present invention, in the first conventional coding method, a scene change in the coding control unit is detected based on the motion amount of the Nth frame from the first frame and the motion amounts of the second to the (N−1)th frame from the first frame, and target code amounts of all frames of the coding control unit are set considering the result of the scene change detection as an index.

According to a fourth aspect of the coding method of the present invention, in the second conventional coding method, a scene change in the coding control unit is detected based on the motion amount of the Nth frame from the Kth frame and the motion amounts of the first to the (K−1)th frame and the (K+1)th to the (N−1)th frame from the Kth frame, and target code amounts of all frames of the coding control unit are set considering the result of the scene change detection as an index.

According to a fifth aspect of the coding method of the present invention, in the first conventional coding method, the degree of difficulty of coding picture signals in the coding control unit is detected from an activity calculated with respect to the first frame, and target code amounts of all frames of the coding control unit are set considering the degree of difficulty and the difference between the Nth frame and the first frame as indices.

According to a sixth aspect of the coding method of the present invention, in the second conventional coding method, the degree of difficulty of coding picture signals in the coding control unit is detected from an activity calculated with respect to the Kth frame, and target code amounts of all frames of the coding control unit are set considering the degree of difficulty and the difference between the Nth frame and the Kth frame as indices.

According to the coding methods as described above, the code amounts can be controlled according to the characteristics of pictures. Especially, changes in pictures in a GOP can be predicted according to the differential information of the P picture. Thus, even in scene-changed pictures or pictures whose motion changes greatly, which are conventionally a problem, code amounts can be assigned according to the characteristics of pictures. Therefore, the process of the present invention can achieve a higher picture quality than conventional processes at the same bit rate. Furthermore, the process of the present invention can achieve the same picture quality at a bit rate lower than that of the conventional processes.

According to a first aspect of a coding device of the present invention, the coding device comprises a unit division means for divining inputted pictures into coding control units comprising one or plurality of frames that are to be subjected to a process selected from the group consisting of an intraframe coding process, an interframe forward coding process, and an interframe bidirectionally predictive coding process; an activity calculation means for calculating a frame activity from each frame of the inputted pictures and calculating a unit activity for each unit from the frame activities of the frames that belong to the unit; a target code amount determination means for determining the target code amount of a coding frame based on the frame activity of the coding frame, the unit activity of a coding unit to which the coding frame belongs, and the average unit activity of previous units; and a coding means for coding the coding frame with the target code amount to generate encoded data.

According to the above aspect, the inputted pictures are controlled for each unit, so that code amounts can be controlled according to the characteristics of pictures. It is preferable that the frame activity calculated for each frame is multiplied by one of three weighting constants predetermined according to whether the coding frame is an I, P or B picture type and that the resulting value is used as a new frame activity. Code amounts can be controlled with high precision according to the characteristics of pictures by performing a weighting operation of an activity according to the picture type.

According to a second aspect of the coding device of the present invention, the coding device comprises an activity function generation means for calculating an activity for each macro block in each frame of inputted pictures, generating an activity function indicating the accumulation of the activity for each macro block in a coding frame, and calculating the frame activity of the coding frame; a target code amount determination means for determining the target code amount of the coding frame by considering at least one of the remaining code amount at the time of coding the coding frame, the generated code amount of previously encoded frames, the activity of the previously encoded frames, the occupancy of a buffer, and the activity of the coding frame; a reference scaling factor calculation means for calculating the reference scaling factor of the coding frame by using at least one of the scaling factor of the previously encoded frames, the generated code amount of the previously encoded frames, the frame activity of the previously encoded frames, the frame activity of the coding frame, and the target code amount; an importance calculation means for detecting a visual importance for each macro block; and a coding means for generating a prediction model based on the activity function and the target code amount, coding the coding frame macro block by macro block by using the prediction model, the reference scaling factor, and the importance, and generating encoded data.

According to the above aspect, coding is performed along the prediction model generated from the activity reflecting the characteristics of the picture type and the reference scaling factor is controlled by the difference between the prediction model and the generated code amount. Therefore, code amounts can be controlled with high precision according to the characteristics of pictures.

According to a third aspect of the coding device of the present invention, the coding device comprises an activity function generation means for calculating an activity for each macro block in each frame with respect to inputted pictures, generating an activity function indicating the accumulation of the activity for each macro block in a coding frame, and calculating the frame activity of the coding frame; a target code amount determination means for determining the target code amount of the coding frame by using at least one of the remaining code amount at the time of coding the coding frame, the generated code amount of previously encoded frames, the activity of the previously encoded frames, the occupancy of a buffer, and the activity of the coding frame; a reference scaling factor calculation means for calculating the reference scaling factor of the coding frame by using at least one of the scaling factor of the previously encoded frames, the generated code amount of the previously encoded frames, the frame activity of the previously encoded frames, the frame activity of the coding frame, and the target code amount; an importance calculation means for detecting a visual importance for each macro block; and a coding means for generating a prediction model based on the activity function and the target code amount, setting a region with a specific width with respect to the prediction model, coding the coding frame macro block by macro block by using the reference scaling factor and the importance, correcting at least one of the reference scaling factor, the prediction model, the target code amount, and the region according to a deviation amount when the accumulation of a generated code amount for each macro block deviates from the region, and generating encoded data.

According to the above aspect, the region with a specific width is set with respect to the prediction model generated from the activity reflecting the characteristics of the picture, coding is performed along the prediction model, and the reference scaling factor is controlled according to the deviation amount when the generated code amount deviates from the region. Therefore, code amounts can be controlled with high precision according to the characteristics of pictures.

Various preferable embodiments for implementing the second and third aspect of the coding device according to the present invention will be described below.

First, the coding means sets a check point for each integer macro blocks and determines whether the accumulation of the generated code amount for each macro block deviates from the region at the check point or not. By setting a check point for each integer macro blocks, the fluctuation of the reference scaling factor can be reduced. Therefore, stable regenerated pictures can be provided while performing control with high precision according to the characteristics of pictures.

In addition, the importance calculation means calculates the importance for each orthogonal transformation block, calculates the sum of absolute values of AC components in orthogonal transformation data of the orthogonal transformation block when the coding system of a coding block is an interframe coding system and when the coding frame is a B picture, and sets the scaling factor of the orthogonal transformation block smaller than the reference scaling factor if the sum of the absolute values is larger than a threshold. By protecting regions for a moving object and regions whose motion vector is large, code amounts can be controlled with high precision according to the characteristics of pictures.

Furthermore, the importance calculation means calculates the importance for each orthogonal transformation block, calculates the sum of absolute values of AC components in orthogonal transformation data of the orthogonal transformation block when the coding system of a coding block is an interframe coding system and when the coding frame is a B picture, and sets all orthogonal transformation data of the orthogonal transformation block to 0 if the sum of the absolute values is smaller than a threshold. Reproducing still regions and regions where motion vector is effective only by motion compensation, large code amounts can be assigned to other regions. Therefore, code amounts can be controlled with high precision according to the characteristics of pictures.

Moreover, the importance calculation means calculates the importance for each orthogonal transformation block; calculates the number of sampling values having a larger value than a threshold among the sampling values of a Y-R component block in the orthogonal transformation block with respect to an inputted picture for which a differential operation for motion compensation is not performed, when the coding system of a coding block is an interframe coding system; and sets the scaling factor of the orthogonal transformation block smaller than the reference scaling factor if the number of the sampling values is larger than a predetermined value. By protecting a red color having a high chroma, the picture quality can be improved.

In addition, the importance calculation means calculates the importance for each orthogonal transformation block; calculates the number of sampling values having a larger value than a threshold among the sampling values of a Y-B component block in the orthogonal transformation block with respect to an inputted picture for which a differential operation for motion compensation is not performed, when the coding system of a coding block is an interframe coding system; and sets the scaling factor of the orthogonal transformation block smaller than the reference scaling factor if the number of the sampling values is larger than a predetermined value. By protecting a blue color having a high chroma, the picture quality can be improved.

Furthermore, the importance calculation means calculates the importance for each orthogonal transformation block; calculates the number of sampling values having a value in the range of a first threshold to a second threshold with respect to a Y component block in a coding macro block and defines the number of the sampling values as a first detected value, calculates the number of sampling values having a value in the range of a third threshold to a fourth threshold with respect to a Y-R component block in the coding macro block and defines the number of the sampling values as a second detected value, and calculates the number of sampling values having a value in the range of a fifth threshold to a six threshold with respect to a Y-B component block in the coding macro block and defines the number of the sampling values as a third detected value, with respect to an inputted picture for which a differential operation for motion compensation is not performed, when the coding system of a coding block is an interframe coding system; and sets the scaling factor of a coding macro block smaller than the reference scaling factor when the first detected value is larger than a first number, when the second detected value is larger than a second number, and when the third detected value is larger than a third number. By detecting a specific color, for example, a skin color, and protecting the color, the picture quality can be improved.

Moreover, the importance calculation means calculates the importance for each orthogonal transformation block; calculates the number of sampling values in which the absolute value of a difference between a sampling value of a Y-R component block and a sampling value of a Y-B component block is larger than a threshold with respect to the Y-B component block and the Y-R component block in a coding macro block, with respect to an inputted picture for which a differential operation for motion compensation is not performed, when the coding system of a coding block is an interframe coding system; and sets the scaling factor of a coding macro block smaller than the reference scaling factor if the number of the sampling values is larger than a predetermined value. By protecting red and blue colors having a high chroma, the picture quality can be improved.

In addition, the importance calculation means calculates the importance for each orthogonal transformation block; calculates the activity of the orthogonal transformation block with respect to an inputted picture for which a differential operation for motion compensation is not performed and calculates the sum of absolute values of AC components in the orthogonal transformation block with respect to a differential picture for which a differential operation for motion compensation is performed when the coding system of a coding block is an interframe coding system; and sets the scaling factor of the orthogonal transformation block larger than the reference scaling factor when the activity is larger than a first threshold and the sum of the absolute values of the AC components is larger than a second threshold. By not protecting regions where visual deterioration is unnoticeable and providing large code amounts to other regions, code amounts can be controlled with high precision according to the characteristics of pictures.

Furthermore, the importance calculation means calculates the importance for each macro block, and sets the scaling factor of a coding macro block larger than the reference scaling factor when the coding macro block is located at one of the upper end, lower end, left end and right end of the screen. By not protecting regions where visual deterioration is unnoticeable and providing large code amounts to other regions, code amounts can be controlled with high precision according to the characteristics of pictures.

Moreover, the importance calculation means calculates the importance for each orthogonal transformation block; and sets the scaling factor of a coding macro block smaller than the standard scaling factor when the coding system of a coding block is an interframe coding system, when types of the motion vector of the coding macro block and the motion vectors of macro blocks around the coding macro block are detected, and when the type of the motion vector of the coding macro block differs from the type of the motion vectors of the macro blocks around the coding macro block. By protecting regions for a moving object and regions whose motion vector is large, code amounts can be controlled with high precision according to the characteristics of pictures.

In addition, a motion vector detection portion properly switches a plurality of predictive operation methods with respect to an inputted picture, and wherein a code amount control means calculates the importance for each macro block, and sets the importance of a coding macro block high when the coding system of a coding block is an interframe coding system and when the type of a first motion vector detected for each macro block differs from the type of a second motion vector detected for each super block comprising a plurality of macro blocks. By protecting regions for a moving object and regions whose motion vector is large, code amounts can be controlled with high precision according to the characteristics of pictures.

Furthermore, the importance calculation means detects importances with respect to T orthogonal transformation blocks that belong to the macro block, and defines the highest importance among the detected T importances as the importance of the macro block.

Moreover, the importance calculation means detects the importance for each orthogonal transformation block, and sets all data of the block after orthogonal transformation to 0 and sets the activity of the orthogonal transformation block to 0 when the block is determined as unimportant.

BEST MODE FOR CARRYING OUT THE INVENTION

Preferred embodiments of the present invention will be described below with reference to the drawings.

First Embodiment

Figure 1:
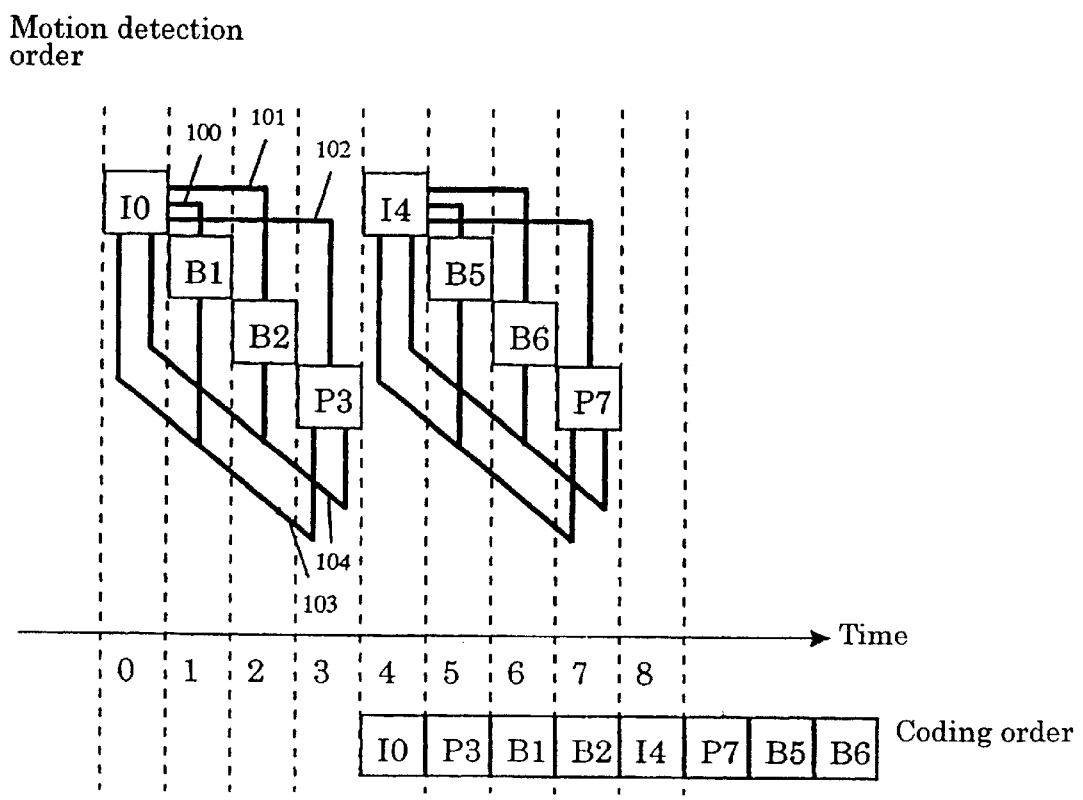
FIG. 1 shows a flow of a coding process according to first, third and fifth embodiments of the present invention.

FIG. 1 shows a flow of a coding process according to a first embodiment of the present invention. To simplify the description, the coding control range is selected as four frames. This frame structure corresponds to N=4 and M=3 in a GOP structure of the MPEG. In FIG. 1, I0, B1, B2, P3, I4, B5, B6 and P7 represent frames in input order. The letters represent picture types of the MPEG (I represents an I picture, B represents a B picture, and P represents a P picture), and the numbers represent the inputted frame orders.

Also, 100 indicates a process for detecting the motion of B1 from I0. 101 indicates a process for detecting the motion of B2 from I0, 102 indicates a process for detecting the motion of P3 from I0, 103 indicates a process for detecting the motion of B1 from the frames I0 and P3 which are located before and after B1, and 104 indicates a process for detecting the motion of B2 from the frames I0 and P3 which are located before and after B2. The detection of the motion of a frame from frames which are located before and after the frame means, for example, the detection of vectors of a frame from the average value of frames which are located before and after the frame.

The target code amount in the GOP structure (N=4 and M=3) in this embodiment is set for 1 GOP (I0, B1, B2 and P3) in FIG. 1 as a unit. In FIG. 1, the horizontal axis represents time, indicating that the process 100 is performed at time 1, that the process 101 is performed at time 2, and that the processes 102, 103 and 104 are performed at time 3.

Therefore, all of the processes 100, 101, 102, 103 and 104 have ended at time 4. In this embodiment, differential data after detecting the motion in the process 102 (that is, the P3 picture whose motion is detected) is paid attention to, and the assignment of code amounts to the frames in a code amount assignment control range is controlled according to the sum of the absolute values of the differential data. For example, the following cases are shown.

[Case 1] the case where the sum of the absolute values of the differential data is larger than a first threshold
(the code amount assigned to I0):(the code amount assigned to P3):
(the code amount assigned to B1):(the code amount assigned to B2)=2:2:1:1

[Case 2] the case where the sum of the absolute values of the differential data is smaller than a second threshold
(the code amount assigned to I0):(the code amount assigned to P3):
(the code amount assigned to B1):(the code amount assigned to B2)=9:3:1:1

[Case 3] the case where the absolute values of the differential data is in the range of the second threshold to the first threshold
(the code amount assigned to I0):(the code amount assigned to P3):
(the code amount assigned to B1):(the code amount assigned to B2)=4:2:1:1

Thus, the code amounts can be controlled according to the characteristics of pictures by changing the ratio of the code amount assigned to each frame according to the sum of the absolute values of the differential data. Especially, changes in pictures in a GOP can be predicted according to the differential information of the P picture. Thus, even in scene-changed pictures or pictures whose motion changes greatly, which are a conventional problem, code amounts can be assigned according to the characteristics of pictures. (In this case, the ratio of the code amounts approaches I0:P3:B1:B2=2:2:1:1.) Therefore, the process of this embodiment can achieve a higher picture quality than conventional processes at the same bit rate. Furthermore, the process of this embodiment can achieve the same picture quality at a bit rate lower than that of the conventional processes.

Second Embodiment

Figure 2:
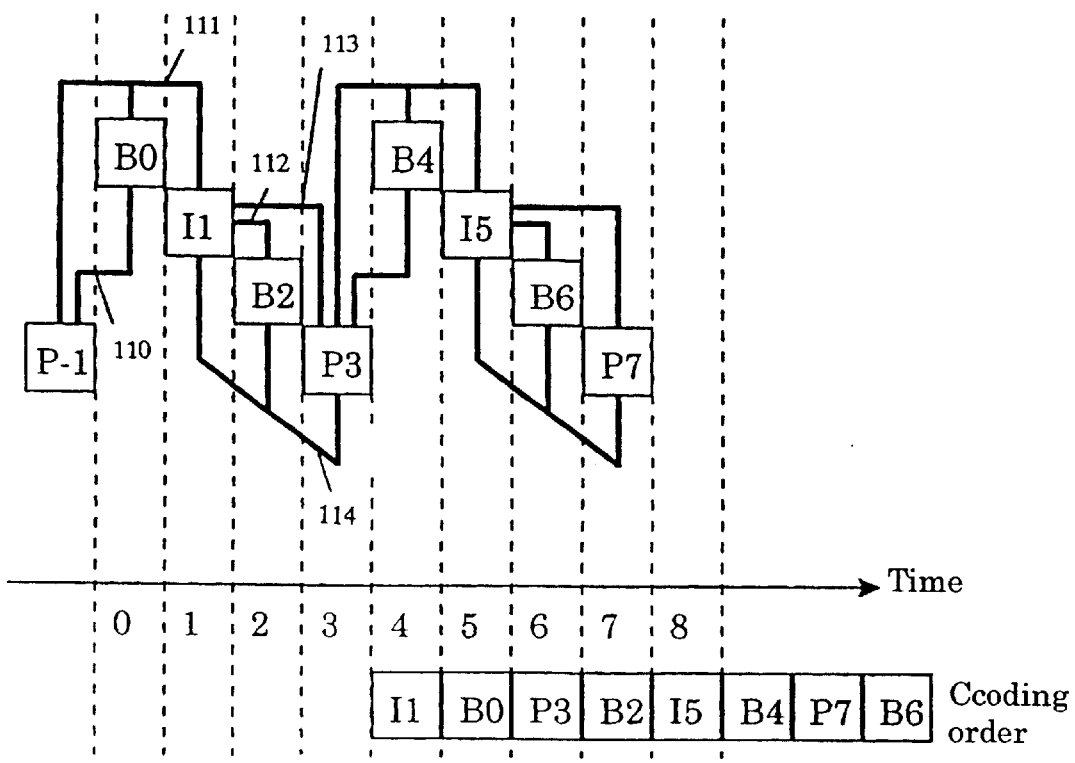
FIG. 2 shows a flow of a coding process according to second, fourth and sixth embodiments of the present invention.

FIG. 2 shows a flow of a coding process according to a second embodiment of the present invention. To simplify the description, the coding control range is selected as four frames in this embodiment as well. This frame structure corresponds to N=4 and M=2 of a GOP structure in the MPEG. In FIG. 2, P-1, B0, I1, B2, P3, B4, I5, B6 and P7 represent frames in input order. The letters represent picture types of the MPEG, and the numbers represent the inputted frame orders.

Also, 110 indicates a process for detecting the motion of B0 from P-1. 111 indicates a process for detecting the motion of B0 from the frames P-1 and I1 which are located before and after B0, 112 indicates a process for detecting the motion of B2 from I1, 113 indicates a process for detecting the motion of P3 from I1, and 114 indicates a process for detecting the motion of B2 from the frames I1 and P3 which are located before and after B2.

The target code amount in the GOP structure (N=4 and M=2) in this embodiment is set for 1 GOP (B0, I1, B2 and P3) in FIG. 2 as a unit. In FIG. 2, the horizontal axis represents time, indicating that the process 110 is performed at time 0, that the process 111 is performed at time 1, that the process 112 is performed at time 2, and that the processes 113 and 114 are performed at time 3.

Therefore, all of the processes 110, 111, 112, 113 and 114 have ended at time 4. In this embodiment, differential data after detecting the motion in the process 204 (that is, the P3 picture whose motion is detected) is paid attention to, and the assignment of code amounts to the frames in a code amount assignment control range is controlled according to the sum of the absolute values of the differential data. For example, the following cases are shown.

[Case 1] the case where the sum of the absolute values of the differential data is larger than a first threshold
(the code amount assigned to I1):(the code amount assigned to P3):
(the code amount assigned to B0):(the code amount assigned to B2)=2:2:1:1

[Case 2] the case where the sum of the absolute values of the differential data is smaller than a second threshold
(the code amount assigned to I1):(the code amount assigned to P3):
(the code amount assigned to B0):(the code amount assigned to B2)=9:3:1:1

[Case 3] the case where the absolute values of the differential data is in the range of the second threshold to the first threshold
(the code amount assigned to I1):(the code amount assigned to P3):
(the code amount assigned to B0):(the code amount assigned to B2)=4:2:1:1

Thus, the code amounts can be controlled according to the characteristics of pictures by changing the ratio of the code amount assigned to each frame according to the sum of the absolute values of the differential data. Especially, changes in pictures in a GOP can be predicted according to the differential information of the P picture. Thus, even in scene-changed pictures or pictures whose motion changes greatly, which are a conventional problem, code amounts can be assigned according to the characteristics of pictures. (In this case, the ratio of the code amounts approaches I1:P3:B0:B2=2:2:1:1.) Therefore, the process of this embodiment can achieve a higher picture quality than conventional processes at the same bit rate. Furthermore, the process of this embodiment can achieve the same picture quality at a bit rate lower than that of the conventional processes.

Third Embodiment

A third embodiment of the present invention will be described with reference to FIG. 1. To simplify the description, the coding control range is selected as four frames in this embodiment as well. This frame structure corresponds to N=4 and M=3 in a GOP structure of the MPEG. The basic operation based on FIG. 1 in this embodiment is the same as that in the first embodiment. However, this embodiment is characterized in that the assignment of code amounts to frames in a code amount assignment control range is controlled according to the motion vectors and the differential data after detecting the motion in the process 100, the motion vectors and the differential data after detecting the motion in the process 101, and the motion vectors and the differential data after detecting the motion in the process 102.

For determining the assignment of code amounts, the following four conditions are set.

(Condition 1) The sum of the absolute values of the differential data of B1 with respect to I0 is larger than a first threshold.

(Condition 2) The sum of the absolute values of the differential data of B2 with respect to I0 is larger than a second threshold.

(Condition 3) The sum of the absolute values of the differential data of P3 with respect to I0 is larger than a third threshold.

(Condition 4) The absolute value of the difference between the motion vectors of P3 with respect to I0 and the motion vectors of B1 with respect to I0 extended to the time 3 is smaller than a fourth threshold, and the absolute value of the difference between the motion vectors of P3 with respect to I0 and the motion vectors of B2 with respect to I0 extended to the time 3 is smaller than a fifth threshold.

The following code amount assignment is performed using the above conditions.

[Case 1] the case where none of the conditions 1, 2, 3 and 4 are satisfied (the code amount assigned to I0):(the code amount assigned to P3):

(the code amount assigned to B1):(the code amount assigned to B2)=4:2:1:1

[Case 2] the case where only the condition 1 is satisfied (the code amount assigned to I0):(the code amount assigned to P3):

(the code amount assigned to B1):(the code amount assigned to B2)=3:3:2:2

[Case 3] the case where only the condition 2 is satisfied (the code amount assigned to I0):(the code amount assigned to P3):

(the code amount assigned to B1):(the code amount assigned to B2)=3:3:2:2

[Case 4] the case where only the condition 3 is satisfied (the code amount assigned to I0):(the code amount assigned to P3):

(the code amount assigned to B1):(the code amount assigned to B2)=3:3:2:2

[Case 5] the case where the conditions 1 and 2 are satisfied (the code amount assigned to I0):(the code amount assigned to P3):

(the code amount assigned to B1):(the code amount assigned to B2)=3:3:3:2

[Case 6] the case where the conditions 2 and 3 are satisfied (the code amount assigned to I0):(the code amount assigned to P3):

(the code amount assigned to B1):(the code amount assigned to B2)=3:3:2:3

[Case 7] the case where the conditions 1 and 3 are satisfied (the code amount assigned to I0):(the code amount assigned to P3):

(the code amount assigned to B1):(the code amount assigned to B2)=1:1:1:1

[Case 8] the case where the conditions 1, 2 and 3 are satisfied (the code amount assigned to I0):(the code amount assigned to P3):

(the code amount assigned to B1):(the code amount assigned to B2)=1:1:1:1

[Case 9] the case where the condition 4 is satisfied (the code amount assigned to I0):(the code amount assigned to P3):

(the code amount assigned to B1):(the code amount assigned to B2)=9:3:1:1

Thus, the code amounts can be controlled corresponding to the characteristics of pictures by performing code amount assignment considering the easiness of the motion prediction. Especially, changes in pictures in a GOP can be predicted according to the differential information of the P picture. Thus, even in scene-changed pictures or pictures whose motion changes greatly, which are a conventional problem, code amounts can be assigned according to the characteristics of pictures. (In this case, the ratio of the code amounts approaches I0:P3:B1:B2=1:1:1:1.) Therefore, the process of this embodiment can achieve a higher picture quality than conventional processes at the same bit rate. Furthermore, the process of this embodiment can achieve the same picture quality at a bit rate lower than that of the conventional processes.

Fourth Embodiment

A fourth embodiment of the present invention will be described with reference to FIG. 2. To simplify the description, the coding control range is selected as four frames in this embodiment as well. This frame structure corresponds to N=4 and M=2 in a GOP structure of the MPEG. The basic operation based on FIG. 2 in this embodiment is the same as that in the second embodiment. However, this embodiment is characterized in that the assignment of code amounts to frames in a code amount assignment control range is controlled according to the motion vectors and the differential data after detecting the motion in the process 111, the motion vectors and the differential data after detecting the motion in the process 112, and the motion vectors and the differential data after detecting the motion in the process 113.

For determining the assignment of code amounts, the following four conditions are set.

(Condition 1) The sum of the absolute values of the differential data of B0 with respect to I1 is larger than a first threshold.

(Condition 2) The sum of the absolute values of the differential data of B2 with respect to I1 is larger than a second threshold.

(Condition 3) The sum of the absolute values of the differential data of P3 with respect to I1 is larger than a third threshold.

(Condition 4) The absolute value of the difference between the motion vectors of P3 with respect to I1 and the motion vectors of B0 with respect to I1 extended to the time 3 is smaller than a fourth threshold, and the absolute value of the difference between the motion vectors of P3 with respect to I1 and the motion vectors of B2 with respect to I1 extended to the time 3 is smaller than a fifth threshold.

The following code amount assignment is performed using the above conditions.

[Case 1] the case where none of the conditions 1, 2, 3 and 4 are satisfied (the code amount assigned to I1):(the code amount assigned to P3):

(the code amount assigned to B0):(the code amount assigned to B2)=4:2:1:1

[Case 2] the case where only the condition 1 is satisfied (the code amount assigned to I1):(the code amount assigned to P3):

(the code amount assigned to B0):(the code amount assigned to B2)=3:3:2:2

[Case 3] the case where only the condition 2 is satisfied (the code amount assigned to I1):(the code amount assigned to P3):

(the code amount assigned to B0):(the code amount assigned to B2)=3:3:2:2

[Case 4] the case where only the condition 3 is satisfied
(the code amount assigned to I1):(the code amount assigned to P3):
(the code amount assigned to B0):(the code amount assigned to B2)=3:3:2:2

[Case 5] the case where the conditions 1 and 2 are satisfied
(the code amount assigned to I1):(the code amount assigned to P3):
(the code amount assigned to B0):(the code amount assigned to B2)=3:3:3:2

[Case 6] the case where the conditions 2 and 3 are satisfied
(the code amount assigned to I1):(the code amount assigned to P3):
(the code amount assigned to B0):(the code amount assigned to B2)=3:3:2:3

[Case 7] the case where the conditions 1 and 3 are satisfied
(the code amount assigned to I1):(the code amount assigned to P3):
(the code amount assigned to B0):(the code amount assigned to B2)=1:1:1:1

[Case 8] the case where the conditions 1, 2 and 3 are satisfied
(the code amount assigned to I1):(the code amount assigned to P3):
(the code amount assigned to B0):(the code amount assigned to B2)=1:1:1:1

[Case 9] the case where the condition 4 is satisfied
(the code amount assigned to I1):(the code amount assigned to P3):
(the code amount assigned to B0):(the code amount assigned to B2)=9:3:1:1

Thus, the code amounts can be controlled according to the characteristics of pictures by performing code amount assignment considering the easiness of the motion prediction. Especially, changes in pictures in a GOP can be predicted according to the differential information of the P picture. Thus, even in scene-changed pictures or pictures whose motion changes greatly, which are a conventional problem, code amounts can be assigned according to the characteristics of pictures. (In this case, the ratio of the code amounts approaches I1:P3:B0:B2=1:1:1:1.) Therefore, the process of this embodiment can achieve a higher picture quality than conventional processes at the same bit rate. Furthermore, the process of this embodiment can achieve the same picture quality at a bit rate lower than that of the conventional processes.

Fifth Embodiment

A fifth embodiment of the present invention will be described with reference to FIG. 1. To simplify the description, the coding control range is selected as four frames in this embodiment as well. This frame structure corresponds to N=4 and M=3 in a GOP structure of the MPEG. The basic operation based on FIG. 1 in this embodiment is the same as that in the first embodiment. However, this embodiment is characterized in that an activity operation is performed with respect to the frame I0, that the degree of difficulty of coding the frame I0 is detected by the detected activity, and that the assignment of code amounts to the frames in a code amount assignment control range is controlled according to differential data after detecting the motion in the process 103.

The degrees of difficulty of coding are classified into the following three ranks according to the value of the activity detected in the activity operation with respect to the frame I0.

(Rank 1) The activity is larger than a first threshold.
(Rank 2) The activity is smaller than a second threshold.
(Rank 3) The activity is in the range of the second threshold to the first threshold.

In other words, the rank 1 indicates that the degree of difficulty of coding is high, the rank 2 indicates that the degree of difficulty of coding is low, and the rank 3 indicates that the degree of difficulty of coding is moderate. In this embodiment, the degree of difficulty of coding is determined from the activity. As another method, it is also considered that coding is actually performed to determine the degree of difficulty from an average scaling factor and generated code amounts.

The following code amount assignment is performed using the above ranks and the differential data.

[Case 1] The rank of the frame I0 is 1, and the absolute value of the differential data is larger than a third threshold.
(the code amount assigned to I0):(the code amount assigned to P3):
(the code amount assigned to B1):(the code amount assigned to B2)=2:1:1:1

[Case 2] The rank of the frame I0 is 1, and the absolute value of the differential data is smaller than a fourth threshold.
(the code amount assigned to I0):(the code amount assigned to P3):
(the code amount assigned to B1):(the code amount assigned to B2)=12:3:1:1

[Case 3] The rank of the frame I0 is 1, and the absolute value of the differential data is in the range of the fourth threshold to the third threshold.
(the code amount assigned to I1):(the code amount assigned to P3):
(the code amount assigned to B1):(the code amount assigned to B2)=9:3:1:1

[Case 4] The rank of the frame I0 is 2, and the absolute value of the differential data is larger than the third threshold.
(the code amount assigned to I0):(the code amount assigned to P3):
(the code amount assigned to B1):(the code amount assigned to B2)=1:1:1:1

[Case 5] The rank of the frame I0 is 2, and the absolute value of the differential data is smaller than the fourth threshold.
(the code amount assigned to I0):(the code amount assigned to P3):
(the code amount assigned to B1):(the code amount assigned to B2)=6:3:1:1

[Case 6] The rank of the frame I0 is 2, and the absolute value of the differential data is in the range of the fourth threshold to the third threshold.
(the code amount assigned to I0):(the code amount assigned to P3):
(the code amount assigned to B1):(the code amount assigned to B2)=4:2:1:1

[Case 7] The rank of the frame I0 is 3, and the absolute value of the differential data is larger than the third threshold.
(the code amount assigned to I0):(the code amount assigned to P3):
(the code amount assigned to B1):(the code amount assigned to B2)=1:1:1:1

[Case 8] The rank of the frame I0 is 3, and the absolute value of the differential data is smaller than the fourth threshold.
(the code amount assigned to I0):(the code amount assigned to P3):
(the code amount assigned to B1):(the code amount assigned to B2)=9:3:1:1

[Case 9] The rank of the frame I0 is 3, and the absolute value of the differential data is in the range of the fourth threshold to the third threshold.
(the code amount assigned to I0):(the code amount assigned to P3):
(the code amount assigned to B1):(the code amount assigned to B2)=4:2:1:1

Thus, the code amounts can be controlled according to the characteristics of pictures by performing the code amount assignment as described above. Especially, changes in pictures in a GOP can be predicted according to the differential information of the P picture. Thus, even in scene-changed pictures or pictures whose motion changes greatly, which are a conventional problem, code amounts can be assigned according to the characteristics of pictures. (In this case, the ratio of the code amounts approaches I0:P3:B1:B2=1:1:1:1.) Therefore, the process of this embodiment can achieve a higher picture quality than conventional processes at the same bit rate. Furthermore, the process of this embodiment can achieve the same picture quality at a bit rate lower than that of the conventional processes.

Sixth Embodiment

A sixth embodiment of the present invention will be described with reference to FIG. 2. To simplify the description, the coding control range is selected as four frames in this embodiment as well. This frame structure corresponds to N=4 and M=2 in a GOP structure of the MPEG. The basic operation based on FIG. 2 in this embodiment is the same as that in the second embodiment. However, this embodiment is characterized in that an activity operation is performed with respect to the frame I1, that the degree of difficulty of coding the frame I1 is detected by the detected activity, and that the assignment of code amounts to the frames in a code amount assignment control range is controlled according to differential data after detecting the motion in the process 113.

The degrees of difficulty of coding are classified into the following three ranks according to the value of the activity detected in the activity operation with respect to the frame I1.
(Rank 1) The activity is larger than a first threshold.
(Rank 2) The activity is smaller than a second threshold.
(Rank 3) The activity is in the range of the second threshold to the first threshold.

In other words, the rank 1 indicates that the degree of difficulty of coding is high, the rank 2 indicates that the degree of difficulty of coding is low, and the rank 3 indicates that the degree of difficulty of coding is moderate. In this embodiment, the degree of difficulty of coding is determined from the activity. As another method, it is also considered that coding is actually performed to determine the degree of difficulty from an average scaling factor and generated code amounts.

The following code amount assignment is performed using the above ranks and the differential data.
[Case 1] The rank of the frame I1 is 1, and the absolute value of the differential data is larger than a third threshold.
(the code amount assigned to I1):(the code amount assigned to P3):
(the code amount assigned to B0):(the code amount assigned to B2)=2:1:1:1
[Case 2] The rank of the frame I1 is 1, and the absolute value of the differential data is smaller than a fourth threshold.
(the code amount assigned to I1):(the code amount assigned to P3):
(the code amount assigned to B0):(the code amount assigned to B2)=12:3:1:1
[Case 3] The rank of the frame I1 is 1, and the absolute value of the differential data is in the range of the fourth threshold to the third threshold.
(the code amount assigned to I1):(the code amount assigned to P3):
(the code amount assigned to B0):(the code amount assigned to B2)=9:3:1:1
[Case 4] The rank of the frame I1 is 2, and the absolute value of the differential data is larger than the third threshold.
(the code amount assigned to I1):(the code amount assigned to P3):
(the code amount assigned to B0):(the code amount assigned to B2)=1:1:1:1
[Case 5] The rank of the frame I1 is 2, and the absolute value of the differential data is smaller than the fourth threshold.
(the code amount assigned to I1):(the code amount assigned to P3):
(the code amount assigned to B0):(the code amount assigned to B2)=6:3:1:1
[Case 6] The rank of the frame I1 is 2, and the absolute value of the differential data is in the range of the fourth threshold to the third threshold.
(the code amount assigned to I1):(the code amount assigned to P3):
(the code amount assigned to B0):(the code amount assigned to B2)=4:2:1:1
[Case 7] The rank of the frame I1 is 3, and the absolute value of the differential data is larger than the third threshold.
(the code amount assigned to I1):(the code amount assigned to P3):
(the code amount assigned to B0):(the code amount assigned to B2)=1:1:1:1
[Case 8] The rank of the frame I1 is 3, and the absolute value of the differential data is smaller than the fourth threshold.
(the code amount assigned to I1):(the code amount assigned to P3):
(the code amount assigned to B0):(the code amount assigned to B2)=9:3:1:1
[Case 9] The rank of the frame I1 is 3, and the absolute value of the differential data is in the range of the fourth threshold to the third threshold.
(the code amount assigned to I1):(the code amount assigned to P3):
(the code amount assigned to B0):(the code amount assigned to B2)=4:2:1:1

Thus, the code amounts can be controlled according to the characteristics of pictures by performing the code amount assignment as described above. Especially, changes in pictures in a GOP can be predicted according to the differential information of the P picture. Thus, even in scene-changed pictures or pictures whose motion changes greatly, which are a conventional problem, code amounts can be assigned according to the characteristics of pictures. (In this case, the ratio of the code amounts approaches I1:P3:B0:B2=1:1:1:1.) Therefore, the process of this embodiment can achieve a higher picture quality than conventional processes at the same bit rate. Furthermore, the process of this embodiment can achieve the same picture quality at a bit rate lower than that of the conventional processes.

Seventh Embodiment

Figure 3:
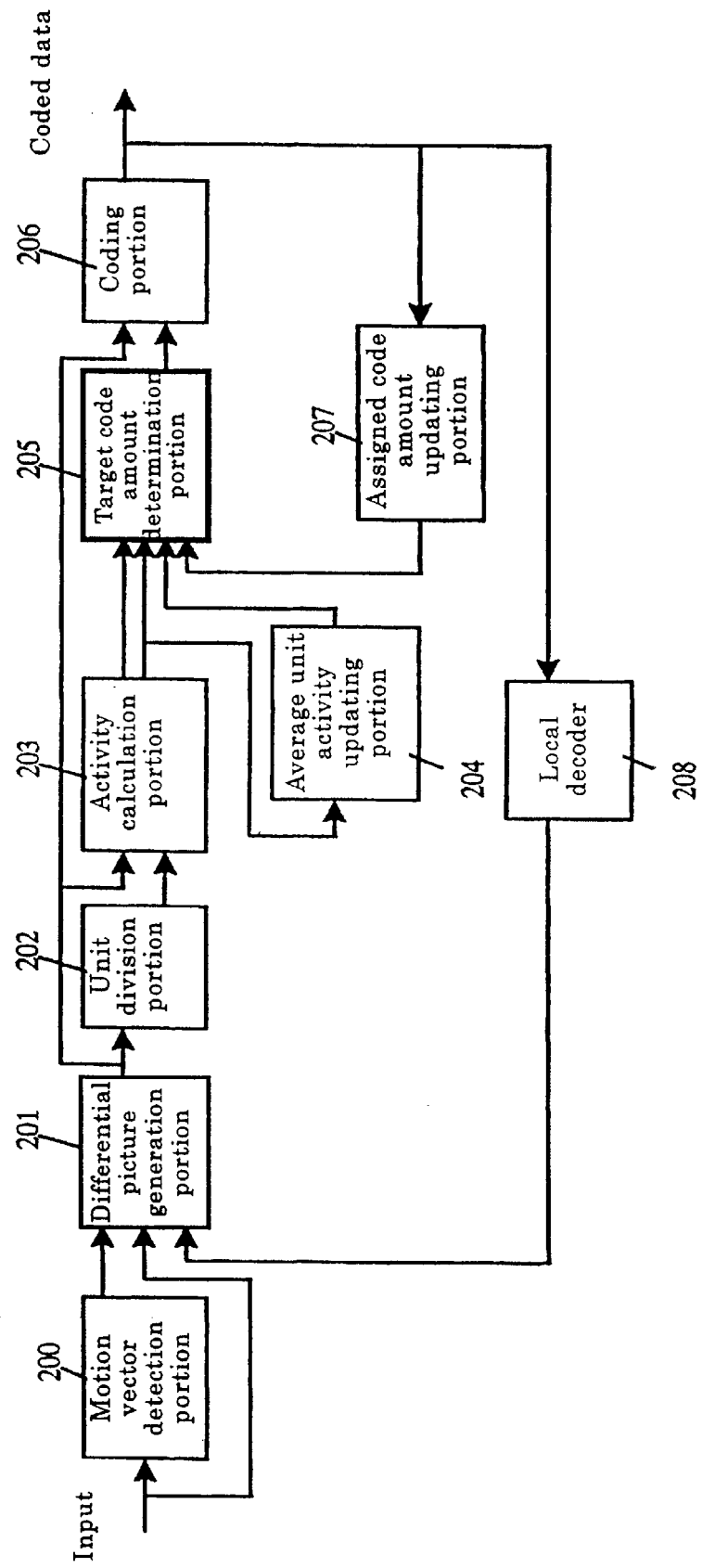
FIG. 3 is a block diagram of a coding device according to seventh and eighth embodiments of the present invention.

FIG. 3 shows a block diagram of a coding device according to a seventh embodiment of the present invention. In FIG. 3, 200 denotes a motion vector detection portion, 201 denotes a differential picture generation portion, 202 denotes a unit division portion, 203 denotes an activity calculation portion, 204 denotes an average unit activity updating portion, 205 denotes a target code amount determination portion, 206 denotes a coding portion, 207 denotes an assigned code amount updating portion, and 208 denotes a local decoder.

Figure 4:
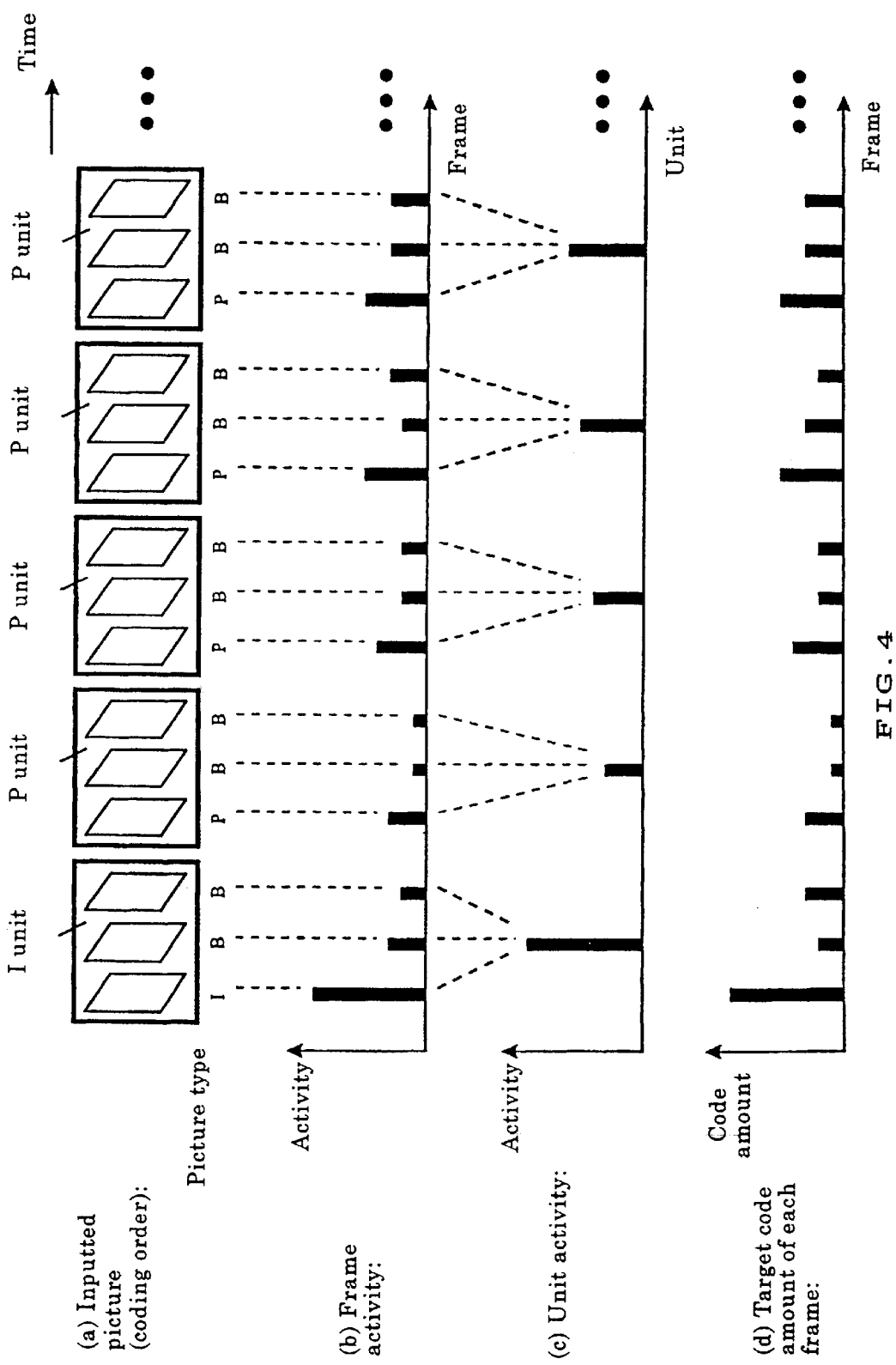
FIG. 4 shows a unit configuration in the seventh and eighth embodiments of the present invention.

The operation of the coding device comprising the above-described configuration will be described with reference to FIG. 4. For the convenience of explanation, the frame frequency is 60 fps, the GOP structure is N=30 and M=3, and the bit rate is 6 Mbps. These conditions are the same in the following embodiments. In FIG. 4, (a) indicates inputted pictures, (b) indicates frame activities found with respect to the inputted pictures, (c) indicates unit activities found with respect to the inputted pictures, and (d) indicates target code amounts set with respect to the inputted pictures.

In FIG. 3, a picture signal is inputted to the motion vector detection portion 200 and the differential picture generation portion 201. When the inputted picture is a P or B picture, the motion vector detection portion 200 detects motion vectors with respect to reference picture(s) stored in the memory and outputs the motion vectors. When the inputted picture is an I picture, the motion vector detection portion 200 does not detect motion vectors. The motion vectors outputted from the motion vector detection portion 200 are inputted to the differential picture generation portion 201.

When the inputted picture is a P or B picture, the differential picture generation portion 201 generates a predicted picture from the inputted motion vectors and decoded reference picture(s) inputted from the local decoder, calculates the differences between the predicted picture and the inputted picture, and outputs a differential picture. The differential picture is inputted to the unit division portion 202, the activity calculation portion 203, and the coding portion 206. When the inputted picture is an I picture, the inputted picture is inputted to the unit division portion 202, the activity calculation portion 203, and the coding portion 206.

The unit division portion 202 defines an I unit comprising one I picture and two B pictures and a P unit comprising one P picture and two B pictures as shown in FIG. 4(a), determines whether the inputted differential picture belongs to the I or P unit according to the picture type of the inputted differential picture, and outputs the information of the unit. The unit information is inputted to the activity calculation portion 203. The activity calculation portion 203 performs an activity operation with respect to the inputted difference signal and outputs a frame activity as shown in FIG. 4(b).

Furthermore, the activity calculation portion 203 outputs the unit activity of the unit to which the differential picture belongs from the inputted unit information as shown in FIG. 4(c). The frame activity is inputted to the target code amount determination portion 205. The unit activity is inputted to the average unit activity updating portion 204 and the target code amount determination portion 205. The average unit activity updating portion 204 updates the average unit activity of the inputted unit from the inputted unit activity.

When the inputted unit is a P unit, the average unit activity updating portion 204 updates the average unit activity of the P unit APm according to the following equation (1):

$$APm=(APm+Aa)/2 \qquad (1)$$

where Aa is unit activity and APm is the average unit activity of the P unit.

When the inputted unit is an I unit, the average unit activity updating portion 204 updates the average unit activity of the I unit AIm according to the following equation (2):

$$AIm=(AIm+Aa)/2 \qquad (2)$$

where Aa is unit activity and AIm is the average unit activity of the I unit.

The updated average unit activity is inputted to the target code amount determination portion 205. The target code amount determination portion 205 outputs a target code amount with respect to a coding frame from the inputted frame activity, unit activity, average unit activity and assigned code amount as shown in FIG. 4(d). The target code amount of the unit Tu is found from the following equation (3):

$$Tu=R \times Aa/(AIm+APm \times 9) \qquad (3)$$

where Aa is the activity of the inputted unit, AIm is the average activity of I units which have been inputted previously, APm is the average activity of P units which have been inputted previously, and R is assigned code amount.

The assigned code amount R is a code amount assigned to a code amount assignment control range when the control range is set, and is being updated according to the generated code amount of a unit. In this embodiment, code amounts are controlled with 10 units, so that the initial value of R is 6M×(10/20)=3M bits. The target code amount of the coding frame Tf is found from the following equation (4):

$$Tf=Tu \times Af/Aa \qquad (4)$$

where Af is the activity of the coding frame.

The target code amount is inputted to the coding portion 206. The coding portion 206 encodes the inputted differential picture with the inputted target code amount and outputs encoded data. The encoded data is inputted to the assigned code amount updating portion 207 and the local decoder 208. The assigned code amount updating portion 207 calculates a generated code amount from the inputted encoded data and updates the assigned code amount R. The local decoder 208 decodes the inputted encoded data and generates a decoded picture.

Thus, code amounts can be controlled with a higher precision by dividing pictures into the I unit comprising an I picture and B pictures and the P unit comprising a P picture and B pictures and controlling code amounts unit by unit.

Eighth Embodiment

An eighth embodiment of the present invention will be described with reference to FIG. 3. The configuration of FIG. 3 and the basic operation in this embodiment are the same as those in the seventh embodiment. However, the activity calculation portion 203 in this embodiment multiplies the calculated activity by a weighting constant with respect to an I picture KI when the frame is an I picture, multiplies the calculated activity by a weighting constant with respect to a P picture KP when the frame is a P picture, and multiplies the calculated activity by a weighting constant with respect to a B picture KB when the frame is a B picture. A new activity obtained by the multiplication is defined as the activity of the frame.

For example, when the activities of the I, P and B pictures before weighting are 10,000, 7,000 and 5,000 respectively, and the weighting constants of the I, P and B pictures are KI=1.0, KP=0.8 and KB=0.5 respectively, the activities of the I, P and B pictures after weighting operation are 10,000, 5,600 and 2,500.

Thus, code amounts can be controlled with a higher precision by performing a weighting operation according to the picture type of the frame with respect to an activity calculated for each frame and controlling the code amount using a new activity obtained by the weighting operation.

Ninth Embodiment

Figure 5:
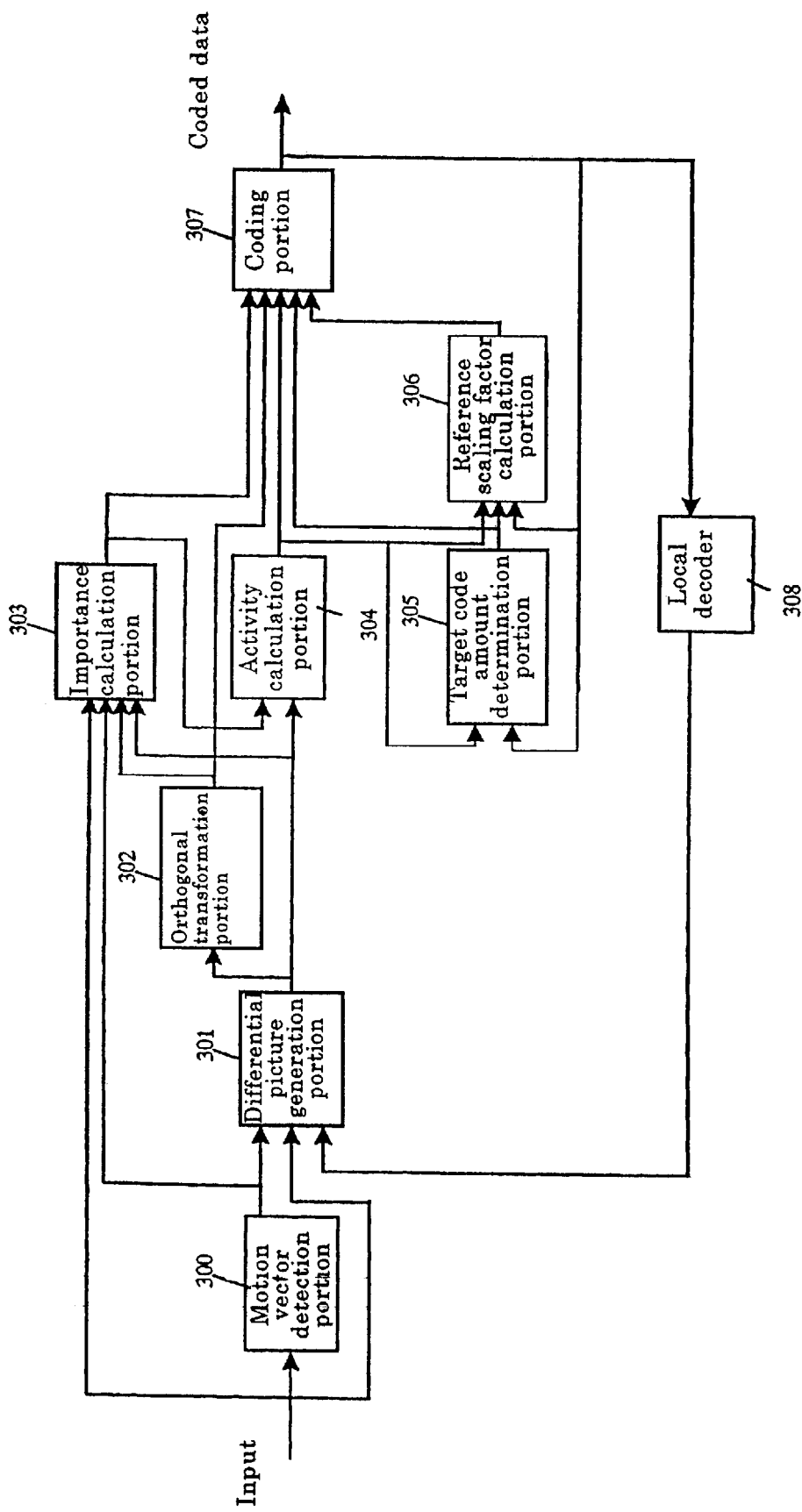
FIG. 5 is a block diagram of a coding device according to ninth to twenty-third embodiments of the present invention.

FIG. 5 shows a block diagram of a coding device according to a ninth embodiment of the present invention. In FIG. 5, 300 denotes a motion vector detection portion, 301 denotes a differential picture generation portion, 302 denotes an orthogonal transformation portion, 303 denotes an importance calculation portion, 304 denotes an activity calculation portion, 305 denotes a target code amount determination portion, 306 denotes a reference scaling factor calculation portion, 307 denotes a coding portion, and 308 denotes a local decoder. The operation of the coding device having such a configuration will be described with reference to FIG. 6 and FIG. 7.

In FIG. 5, a picture signal is inputted to the motion vector detection portion 300, the differential picture generation portion 301, and the importance calculation portion 303. When the inputted picture is a P or B picture, the motion vector detection portion 300 detects motion vectors with respect to reference picture(s) stored in the memory and outputs the motion vectors. When the inputted picture is an I picture, the motion vector detection portion 300 does not detect motion vectors. The motion vectors outputted from the motion vector detection portion 300 are inputted to the differential picture generation portion 301 and the importance calculation portion 303.

When the inputted picture is an I picture, the differential picture generation portion 301 outputs the inputted picture as a differential picture. When the inputted picture is a P or B picture, the differential picture generation portion 301 generates a predicted picture from the inputted motion vectors and decoded reference picture(s) inputted from the local decoder 308, calculates the differences between the predicted picture and the inputted picture, and outputs a differential picture. The differential picture is inputted to the orthogonal transformation portion 302, the importance calculation portion 303, and the activity calculation portion 304.

The orthogonal transformation portion 302 performs the orthogonal transformation operation of the inputted differential picture and outputs orthogonal transformation data. The orthogonal transformation data is inputted to the importance calculation portion 303 and the coding portion 307.

The importance calculation portion 303 calculates a visual importance for each macro block from the motion vectors, the inputted picture, the orthogonal transformation data and the differential picture, each of which is inputted to the importance calculation portion 303, and quantifies the importance by ranking as a class. A macro block whose class is low is quantized by a scaling factor smaller than a reference scaling factor which is a standard in quantization. A macro block whose class is high is quantized by a scaling factor larger than the reference scaling factor. The detected importance is inputted to the activity calculation portion 304 and the coding portion 307.

Figure 6:
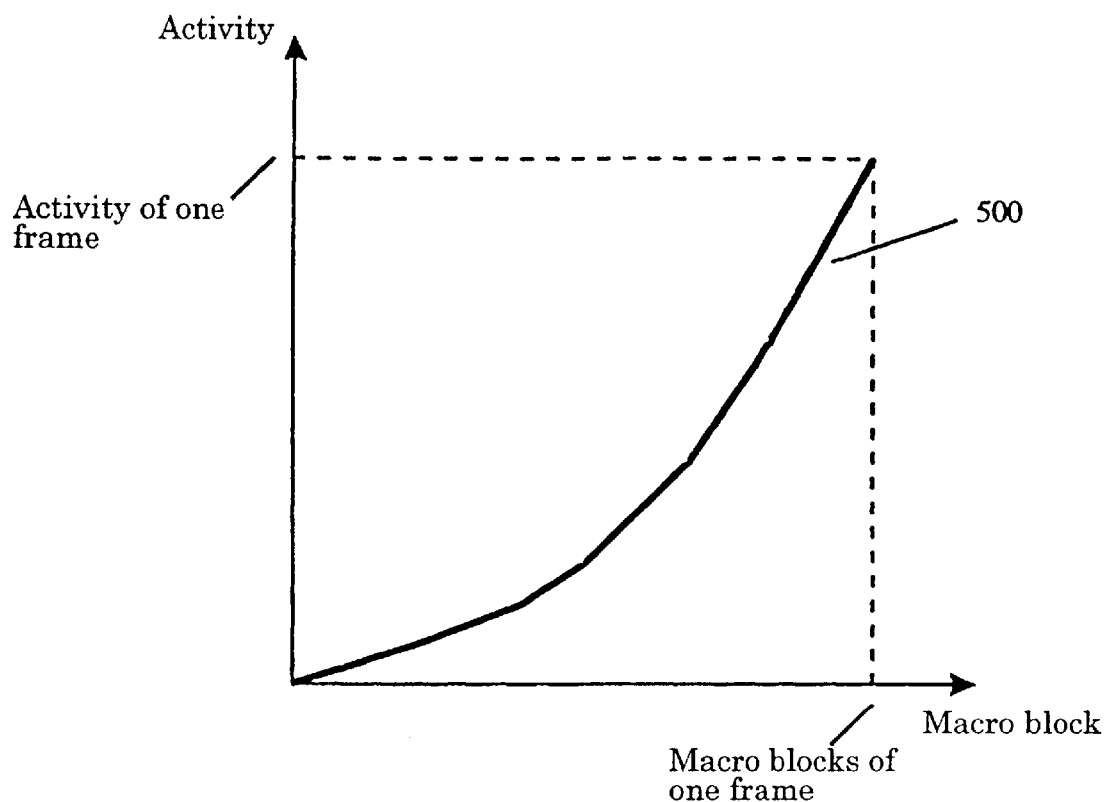
FIG. 6 is a graph showing an activity function in the ninth embodiment of the present invention.

The activity calculation portion 304 calculates an activity for each macro block with respect to the inputted differential picture using the information of the importance provided by the importance calculation portion 303 and generates an activity function indicating the accumulation of the activity for each macro block as shown in FIG. 6 and a frame activity indicating the activity of the whole coding frame. The activity function and the frame activity are inputted to the target code amount determination portion 305, the reference scaling factor calculation portion 306, and the coding portion 307.

The target code amount determination portion 305 determines the target code amount of the coding frame by using at least one of the frame activity of the coding frame, the target code amount, the remaining code amount at the time of coding the coding frame, the frame activity of frames which have been encoded previously, and the occupancy of the buffer, each of which is inputted to the target code amount determination portion 305. The target code amount is inputted to the reference scaling factor calculation portion 306 and the coding portion 307.

The reference scaling factor calculation portion 306 calculates the reference scaling factor of the coding frame by using at least one of the target code amount, the frame activity of the coding frame, the generated code amount of the previously encoded frames, and the average scaling factor of the previously encoded frames, each of which is inputted to the reference scaling factor calculation portion 306. The reference scaling factor is inputted to the coding portion 307.

The coding portion 307 generates the prediction model of a generated code amount from the inputted target code amount and activity function, quantizes the orthogonal transformation data for each macro block according to the reference scaling factor and the importance detected for each macro block, performs variable length coding, and outputs encoded data. The encoded data is inputted to the target code amount determination portion 305, the reference scaling factor calculation portion 306, and the local decoder 308. The local decoder 308 decodes the inputted encoded data and generates a decoded picture. The decoded picture is inputted to the differential picture generation portion 301.

Figure 7:
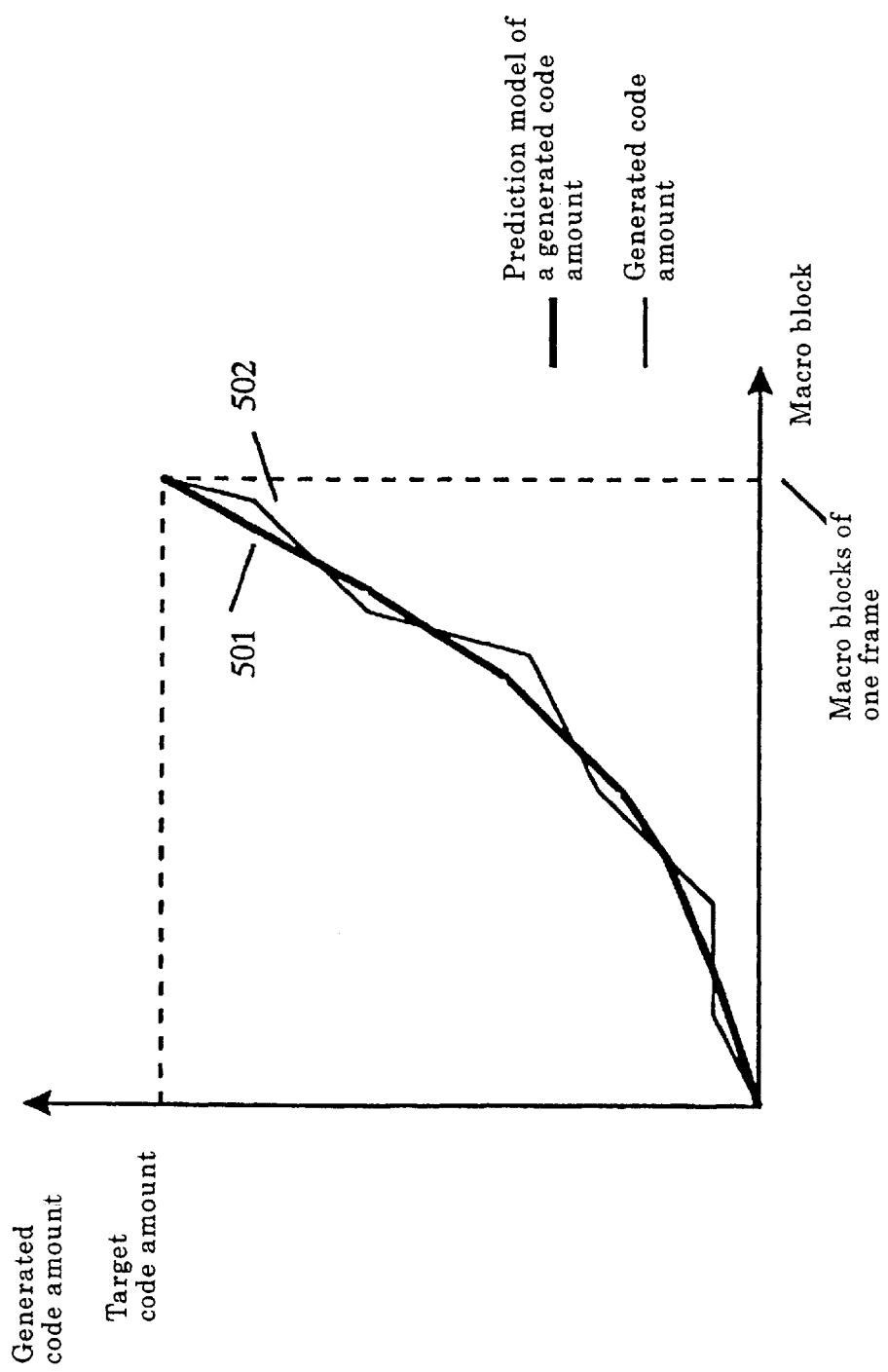
FIG. 7 is a graph showing the relationship between a generated code amount and a prediction model in the ninth embodiment of the present invention.

The operation of the coding portion 307 will be described with reference to FIG. 7. In FIG. 7, a prediction model 501 is the prediction model of a generated code amount found from an activity function 500 as shown in FIG. 6. A generated code amount 502 is a generated code amount in actual coding. The coding portion 307 controls the reference scaling factor based on the difference between the prediction model 501 and the generated code amount 502.

Thus, code amounts can be controlled with high precision according to the characteristics of pictures by generating the prediction model of a generated code amount from an activity indicating the characteristics of a picture with respect to a coding frame, performs coding along the prediction model, and controlling the reference scaling factor based on the difference between a generated code amount and the prediction model.

Furthermore, compared with the feedforward type intraframe inter-macro-block code amount control described as prior art, the coding device of this embodiment does not require a plurality of code amount pre-reading portions. Therefore, the coding device of this embodiment can be implemented with a smaller circuit. In other words, code amounts can be controlled with high precision according to the characteristics of pictures with a smaller circuit.

Tenth Embodiment

Figure 8:
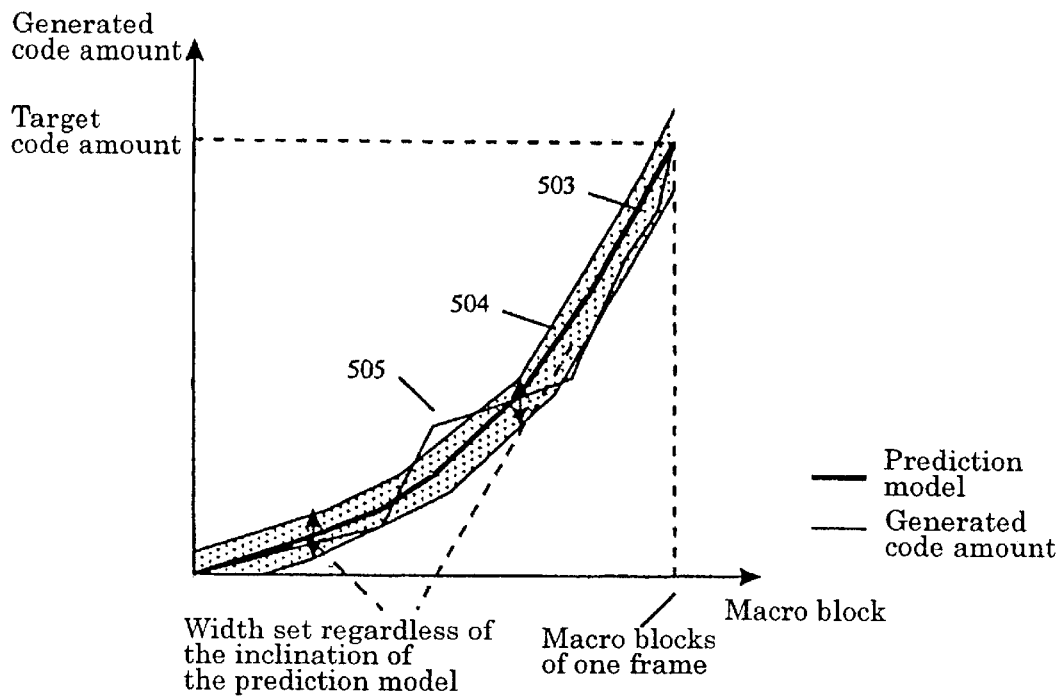
FIG. 8 is a graph showing the relationship between a generated code amount and a prediction model in the tenth embodiment of the present invention.

A tenth embodiment of the present invention will be described with reference to FIGS. 5, 8, 9, 10 and 11. The configuration of FIG. 5 and the basic operation in this embodiment are the same as those in the ninth embodiment. However, the coding portion 307 in this embodiment sets a region with a specific width with respect to a prediction model, encodes a differential picture macro block by macro block according to a reference scaling factor and an importance detected for each macro block, and corrects the reference scaling factor according to a deviation amount when a generated code amount deviates from the region set for the prediction model. The operation of the coding portion 307 will be described with reference to FIG. 8. In FIG. 8, a prediction model 503 is the prediction model of the generated code amount found from the activity function 500 as shown in FIG. 6. A generated code amount 505 is a generated code amount in actual coding. A region 504 is a region with a specific width with respect to the prediction model 503. When the generated code amount deviates from the region 504, the reference scaling factor is corrected according to the deviation amount.

For example, when the width of the region 504 is 1,000 bits and the difference between the generated code amount 505 and the prediction model 503 is larger than 1,000 bits, the reference scaling factor is increased by one. On the contrary, when the difference between the generated code amount 505 and the prediction model 503 is smaller than −1,000 bits, the reference scaling factor is decreased by one.

Figure 9:
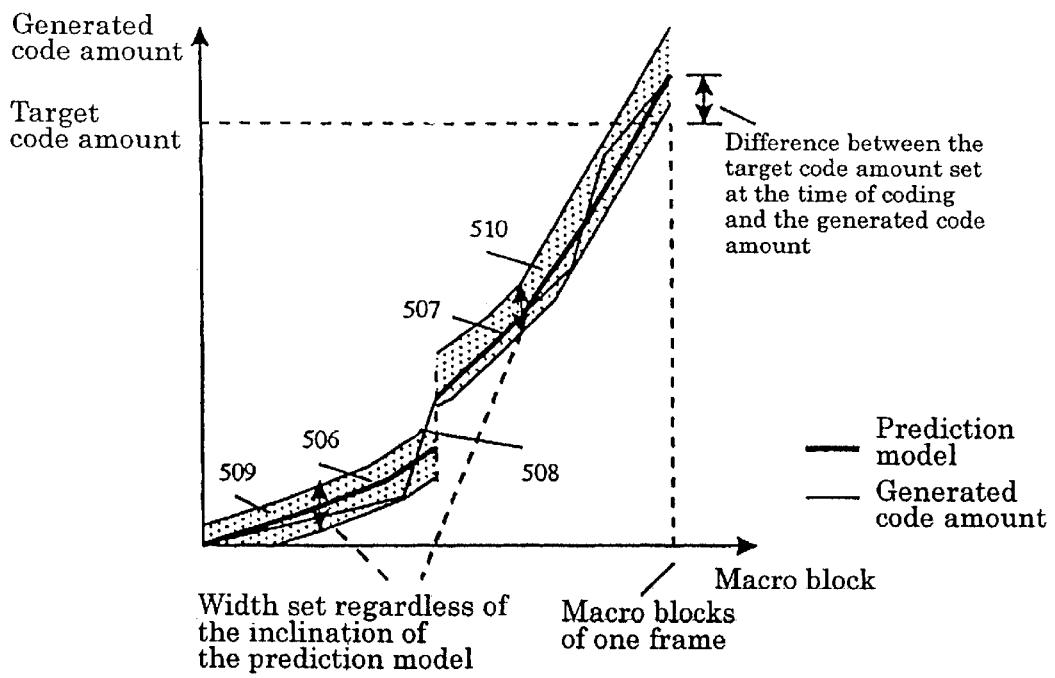
FIG. 9 is a graph showing the relationship between a generated code amount and a prediction model in a modification of the tenth embodiment of the present invention.

It is also considered that when the generated code amount deviates from the region, the reference scaling factor, the prediction model, the target code amount and the region are corrected according to the deviation amount. This correction method will be described with reference to FIG. 9. In FIG. 9, a prediction model 506 is a prediction model before correction and the prediction model of the generated code amount found from the activity function 500 as shown in FIG. 6. A region 509 is a region set for the prediction model before correction 506. A prediction model 507 is a prediction model after correction. A region 510 is a region set for the prediction model after correction 507. A generated code amount 508 is a generated code amount in actual coding. When the generated code amount 508 deviates from the region 509 set for the prediction model before correction 506, the reference scaling factor, the prediction model, the target code amount, and the region are corrected according to the deviation amount.

For example, when the width of the region 509 is 1,000 bits and the difference between the generated code amount 508 and the prediction model 506 is 1,100 bits, which is larger than 1,000 bits, the reference scaling factor is increased by one, and the prediction model and the region are shifted upward by the difference between the generated code amount and the prediction model. In this example, the prediction model and the region are shifted upward by 1,100 bits.

On the contrary, when the difference between the generated code amount 508 and the prediction model 506 is −1,100 bits, which is smaller than −1,000 bits, the reference scaling factor is decreased by one, and the prediction model and the region are shifted downward by the difference between the generated code amount and the prediction model. In this example, the prediction model and the region are shifted downward by 1,100 bits.

When the generated code amount deviates from the region set for the prediction model, the reference scaling factor, the prediction model, the target code amount, and the region are corrected according to the deviation amount. Therefore, the final generated code amount differs from the target code amount set at the start of coding. However, the probability of an occurrence of a new correction can be reduced after correction. Thus, the fluctuation of the reference scaling factor can be reduced, so that a stable picture quality can be obtained. In addition, while the width of the region is constant in this embodiment, the width can be changed according to the inclination of the prediction model.

Since the prediction model is calculated from the activity function, the shape of the prediction model reflects the characteristics of each macro block. For example, when the inclination of the prediction model is high, the activity of the macro block is large, indicating that the macro block is a region including an edge. On the contrary, when the inclination of the prediction model is low, the activity of the macro block is small, indicating that the macro block is a flat region.

In a region where the inclination of the prediction model is high, the fluctuation of the generated code amount depending on the fluctuation of the reference scaling factor is greater than that in a region where the inclination of the prediction model is low. Therefore, when the width set for the prediction model is constant regardless of the inclination of the prediction model and is set small based on the region where the inclination of the prediction model is low, the reference scaling factor fluctuates drastically in the region where the inclination of the prediction model is high. On the contrary, when the width is set large based on the region where the inclination of the prediction model is high, the reference scaling factor is not corrected in the region where the inclination of the prediction model is low even if a reference scaling factor that is not suited to the prediction model is selected. Therefore, it is difficult to perform coding according to the characteristics of the picture.

In particular, unless the reference scaling factor is corrected, the error of the target code amount is large. Therefore, a sufficient code amount cannot be assigned when coding a macro block having a large activity and requiring a large code amount. Accordingly, the width is changed according to the inclination of the prediction model. The width is set large as the inclination is higher, and the width is set small as the inclination is lower. Thus, control can be performed according to the characteristics of the picture.

Figure 10:
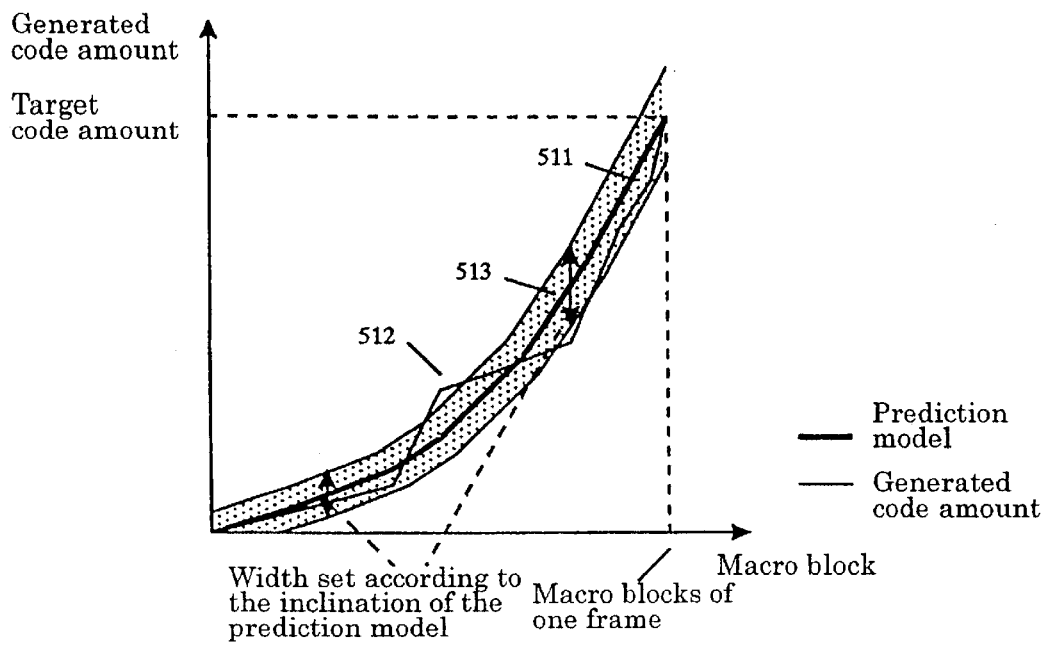
FIG. 10 is a graph showing the relationship between a generated code amount and a prediction model in another modification of the tenth embodiment of the present invention.

FIG. 10 shows an example in which the width of the prediction model is changed according to the inclination of the prediction model and in which the reference scaling factor is corrected according to a deviation amount when the generated code amount deviates from the region. In FIG. 10, a region 513 changes according to the inclination of a prediction model 511. The region 513 is large as the inclination of the prediction model is higher, and the region 513 is small as the inclination of the prediction model is lower. When a generated code amount 512 deviates from the region 513 in coding, the reference scaling factor is operated according to the deviation amount. For example, when the generated code amount 512 is larger than the region 513, the reference scaling factor is increased by one. On the contrary, when the generated code amount 512 is smaller than the region 513, the reference scaling factor is decreased by one.

Figure 11:
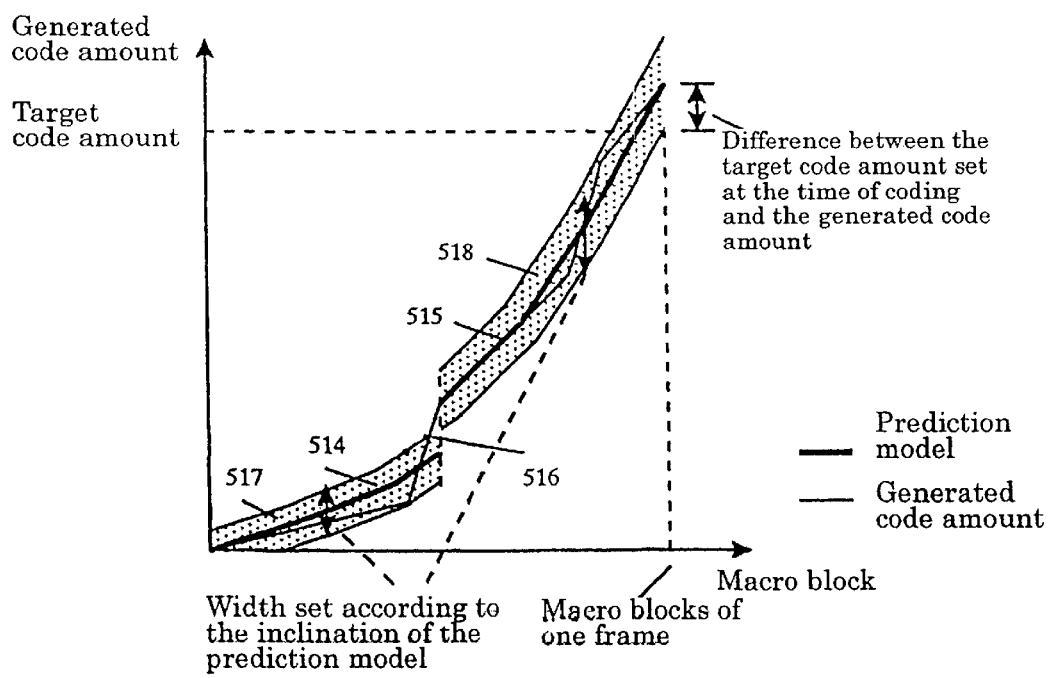
FIG. 11 is a graph showing the relationship between a generated code amount and a prediction model in further modification the tenth embodiment of the present invention.

FIG. 11 shows an example in which the width of the prediction model is changed according to the inclination of the prediction model and in which the reference scaling factor, the prediction model, the target code amount, and the region are corrected according to a deviation amount when the generated code amount deviates from the region. In FIG. 11, a prediction model 514 is a prediction model before correction and the prediction model of the generated code amount found from the activity function 500 as shown in FIG. 6. A region 517 is a region set for the prediction model before correction 514. A prediction model 515 is a prediction model after correction. A region 518 is a region set for the prediction model after correction 515. A generated code amount 516 is a generated code amount in actual coding. When the generated code amount 516 deviates from the region 517 set for the prediction model before correction 514, the reference scaling factor, the prediction model, the target code amount, and the region are corrected according to the deviation amount.

Thus, code amounts can be controlled with high precision according to the characteristics of pictures by generating the prediction model of a generated code amount from an activity indicating the characteristics of a picture with respect to a coding frame, setting a region having a predetermined width with respect to the prediction model, performs coding along the prediction model, and correcting at least one of the reference scaling factor, the prediction model, the target code amount, and the region according to a deviation amount when the generated code amount deviates from the region.

Furthermore, compared with the feedforward type intraframe inter-macro-block code amount control described as prior art, the coding device of this embodiment does not require a plurality of code amount pre-reading portions. Therefore, the coding device of this embodiment can be implemented with a smaller circuit. In other words, code amounts can be controlled with high precision according to the characteristics of pictures with a smaller circuit.

Eleventh Embodiment

Figure 12:
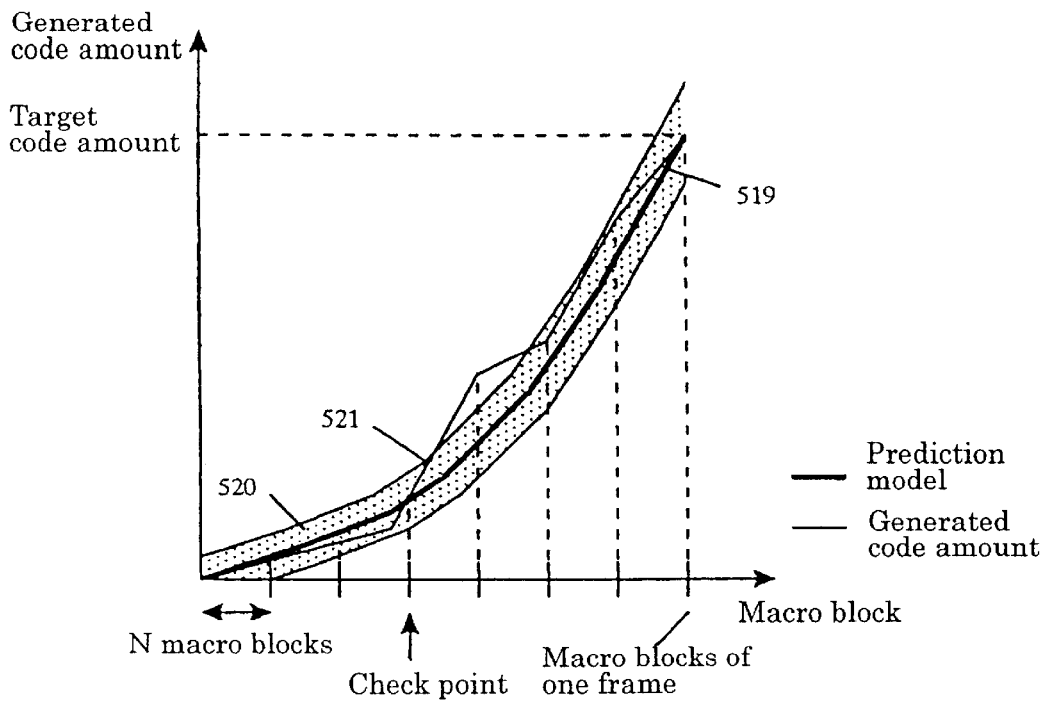
FIG. 12 is a graph showing the relationship between a generated code amount and a prediction model in the eleventh embodiment of the present invention.
Figure 15:
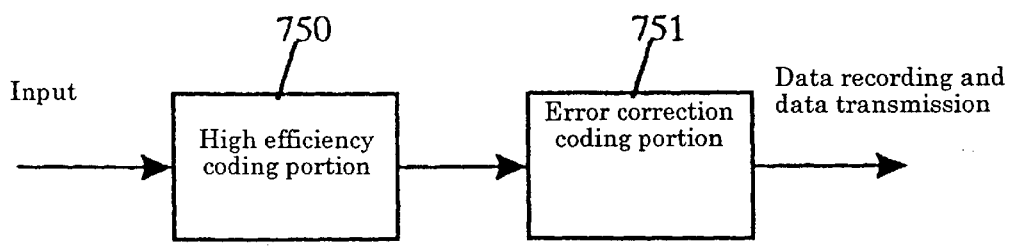
FIG. 15 is a block diagram of a coding device according to a twentyfourth embodiment of the present invention.

An eleventh embodiment of the present invention will be described with reference to FIGS. 5 and 12. The configuration of FIG. 5 and the basic operation in this embodiment are the same as those in the ninth embodiment. However, the coding portion 307 in this embodiment sets the width of a prediction model according to the inclination of the prediction model, sets a check point for each S (an integer of 2 or more) macro blocks, and corrects the reference scaling factor according to a deviation amount when a generated code amount deviates from this region at the check point. The reference scaling factor is not corrected even if the generated code amount deviates from the region other than the check point.

When a scaling factor changes in a picture, the degree of quantization error changes at the point of the change, causing discontinuity. The discontinuity causes a visual deterioration. Therefore, it is desirable that the scaling factor is constant in a picture. Accordingly, in this embodiment, a check point is set for each S macro blocks, and the reference scaling factor is corrected according to a deviation amount only when the generated code amount deviates from the region at the check point. Thus, the stability of the picture quality can be improved.

As described above, in this embodiment, S is an integer of 2 or more. If S is set to one macro block line, the change of the reference scaling factor always occurs at the edges of the screen, so that the visual deterioration can be reduced. If S is set to a number expressed by a power of 2, the counter at the check point can be operated only by bit shift, contributing to the reduction of the size of the circuit.

Furthermore, it is also considered that the reference scaling factor, the predicted mode, the target code amount, and the region are corrected according to a deviation amount only when the generated code amount deviates from the region at the check point.

Thus, the stability of the picture quality can be improved and code amounts can be controlled with high precision according to the characteristics of pictures by generating the prediction model of a generated code amount from an activity indicating the characteristics of a picture with respect to a coding frame, performing coding along the prediction model, correcting the reference scaling factor according to a deviation amount when the generated code amount deviates from the region at a check point set for each S macro blocks.

Furthermore, compared with the feedforward type intraframe inter-macro-block code amount control described as prior art, the coding device of this embodiment does not require a plurality of code amount pre-reading portions. Therefore, the coding device of this embodiment can be implemented with a smaller circuit. In other words, code amounts can be controlled with high precision according to the characteristics of pictures with a smaller circuit.

Twelfth Embodiment

A twelfth embodiment of the present invention will be described with reference to FIG. 5. The configuration of FIG. 5 and the basic operation in this embodiment are the same as those in the ninth embodiment. However, the importance calculation portion 303 in this embodiment calculates importances with respect to T (an integer) orthogonal transformation blocks that belong to the same macro block, finds the sum of the absolute values of AC components with respect to the orthogonal transformation data of the orthogonal transformation block when the coding system of the coding macro block is an interframe coding system and when the coding frame is a B picture, and sets the importance of the block high if the sum of the absolute values of the AC components is larger than a specific threshold.

According to this embodiment, the code amount of the whole picture can be reduced to a constant value or less while restraining the deterioration of the picture quality by protecting regions for a moving object or regions whose detected motion is large.

Thirteenth Embodiment

A thirteenth embodiment of the present invention will be described with reference to FIG. 5. The configuration of FIG. 5 and the basic operation in this embodiment are the same as those in the ninth embodiment. However, the importance calculation portion 303 in this embodiment calculates importances with respect to T orthogonal transformation blocks that belong to the same macro block, finds the sum of the absolute values of AC components with respect to the orthogonal transformation data of the orthogonal transformation block when the coding system of the coding macro block is an interframe coding system and when the coding frame is a B picture, and sets all orthogonal transformation data of the block to 0 if the sum of the absolute values of the AC components is smaller than a specific threshold.

According to this embodiment, the code amount of the whole picture can be reduced to a constant value or less while restraining the deterioration of the picture quality by generating a reproduced picture only with motion compensation with respect to regions where motion detection is effective and providing code amounts to other regions.

Fourteenth Embodiment

A fourteenth embodiment of the present invention will be described with reference to FIG. 5. The configuration of FIG. 5 and the basic operation in this embodiment are the same as those in the ninth embodiment.

However, the importance calculation portion 303 in this embodiment calculates importances with respect to T orthogonal transformation blocks that belong to the same macro block. When the coding system of the picture to be encoded is an interframe coding system, the importance calculation portion 303 calculates the number of sampling values having a larger value than a first threshold with respect to the sampling values of a Y-R component block in a first macro block formed by macro blocking the original picture, and sets the importance of the block high if the number of the sampling values is larger than a predetermined number (for example, 8).

Thus, regions containing a red color having a high chroma can be protected. Therefore, the code amount of the whole picture can be reduced to a constant value or less while restraining the deterioration of the picture quality.

Fifteenth Embodiment

A fifteenth embodiment of the present invention will be described with reference to FIG. 5. The configuration of FIG. 5 and the basic operation in this embodiment are the same as those in the ninth embodiment. However, the importance calculation portion 303 in this embodiment calculates importances with respect to T orthogonal transformation blocks that belong to the same macro block. When the coding system of the picture to be encoded is an interframe coding system, the importance calculation portion 303 calculates the number of sampling values having a larger value than a first threshold with respect to the sampling values of a Y-B component block in a first macro block formed by macro blocking the original picture, and sets the importance of the block high if the number is larger than a predetermined number (for example, 8).

Thus, regions containing a blue color having a high chroma can be protected. Therefore, the code amount of the whole picture can be reduced to a constant value or less while restraining the deterioration of the picture quality.

Sixteenth Embodiment

A sixteenth embodiment of the present invention will be described with reference to FIG. 5. The configuration of FIG. 5 and the basic operation in this embodiment are the same as those in the ninth embodiment. However, the importance calculation portion 303 in this embodiment performs the following process. An importance is calculated with respect to a macro block. When the coding system of the picture to be encoded is an interframe coding system, the number of sampling values having a value in the range of a first threshold to a second threshold is calculated with respect to a Y component block in a first macro block formed by macro blocking the original picture, and the number of the sampling values is defined as a first detected value. Then, the number of sampling values having a value in the range of a third threshold to a fourth threshold is calculated with respect to a Y-R component block in the first macro block, and the number of the sampling values is defined as a second detected value. Furthermore, the number of sampling values having a value in the range of a fifth threshold to a sixth threshold is calculated with respect to a Y-B component block in the first macro block, and the number of the sampling values is defined as a third detected value. When the first detected value is larger than a first predetermined number, when the second detected value is larger than a second predetermined number, and when the third detected value is larger than a third predetermined number, the importances of the blocks are set high.

Thus, regions containing a specific color (for example, a skin color) can be protected. Therefore, the code amount of the whole picture can be reduced to a constant value or less while restraining the deterioration of the picture quality.

Seventeenth Embodiment

A seventeenth embodiment of the present invention will be described with reference to FIG. 5. The configuration of FIG. 5 and the basic operation in this embodiment are the same as those in the ninth embodiment. However, the importance calculation portion 303 in this embodiment performs the following process. Importances are calculated with respect to T orthogonal transformation blocks that belong to the same macro block. When the coding system of the picture to be encoded is an interframe coding system, the number of sampling values in which the absolute value of the difference between a sampling value of a Y-R component block and a sampling value of a Y-B component block is larger than a first threshold is calculated with respect to the Y-B component block and the Y-R component block in a first macro block formed by macro blocking the original picture. If the number of the sampling values is larger than a predetermined number, the importances of the Y-R block and the Y-B block are set high.

Thus, regions containing a red or blue color having a high chroma can be protected. Therefore, the code amount of the whole picture can be reduced to a constant value or less while restraining the deterioration of the picture quality.

Eighteenth Embodiment

An eighteenth embodiment of the present invention will be described with reference to FIG. 5. The configuration of FIG. 5 and the basic operation in this embodiment are the same as those in the ninth embodiment. However, the importance calculation portion 303 in this embodiment performs the following process. Importances are calculated with respect to T orthogonal transformation blocks that belong to the same macro block. When the coding system of the picture to be encoded is an interframe coding system, activities are calculated with respect to blocks in a first macro block formed by macro blocking the original picture, and the sum of the absolute values of AC components is calculated with respect to the orthogonal transformation data of the block. If the activity is larger than a first threshold and the sum of the absolute values of the AC components is larger than a second threshold, the importance of the block is set low.

According to this embodiment, the code amount of the whole picture can be reduced to a constant value or less while restraining the deterioration of the picture quality by not protecting regions where visual deterioration is not noticeable (reducing code amounts assigned to the regions) and assigning large code amounts to other regions.

Nineteenth Embodiment

A nineteenth embodiment of the present invention will be described with reference to FIG. 5. The configuration of FIG. 5 and the basic operation in this embodiment are the same as those in the ninth embodiment. However, the importance calculation portion 303 in this embodiment calculates an importance with respect to a macro block, and if the macro block is located at the upper end, lower end, left end, or right end of the screen, the importance calculation portion 303 sets the importance of the macro block low.

According to this embodiment, the code amount of the whole picture can be reduced to a constant value or less while restraining the deterioration of the picture quality by not protecting regions where visual deterioration is not noticeable (reducing code amounts assigned to the regions) and assigning large code amounts to other regions.

Twentieth Embodiment

A twentieth embodiment of the present invention will be described with reference to FIGS. 5, 13 and 14. The configuration of FIG. 5 and the basic operation in this embodiment are the same as those in the ninth embodiment. However, the importance calculation portion 303 in this embodiment calculates an importance with respect to a macro block, compares the motion vector of the coding macro block and the motion vectors of macro blocks around the coding macro block when the coding system of the picture to be encoded is an interframe coding system, and sets the importance of the macro block high if the types of the vectors are different.

Figure 13:
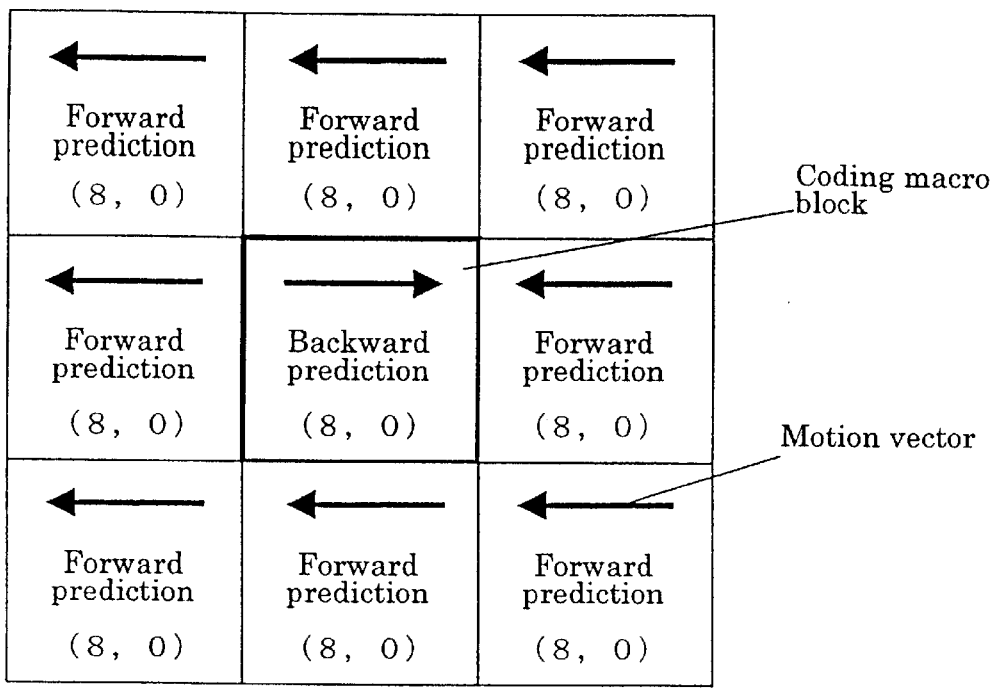
FIG. 13 shows motion vectors of a coding macro block and macro blocks around the coding macro block in the twentieth embodiment of the present invention.

FIG. 13 shows motion vectors when a picture to be encoded is a B picture. The motion vector of a coding macro block is (8,0) backward predictive, and the motion vectors of macro blocks around the coding macro block are (8,0) forward predictive. When the types of the motion vector of a coding macro block and the motion vectors of macro blocks around the coding macro block are different in this manner, the importance of the coding macro block is set high according to this embodiment.

Figure 14:
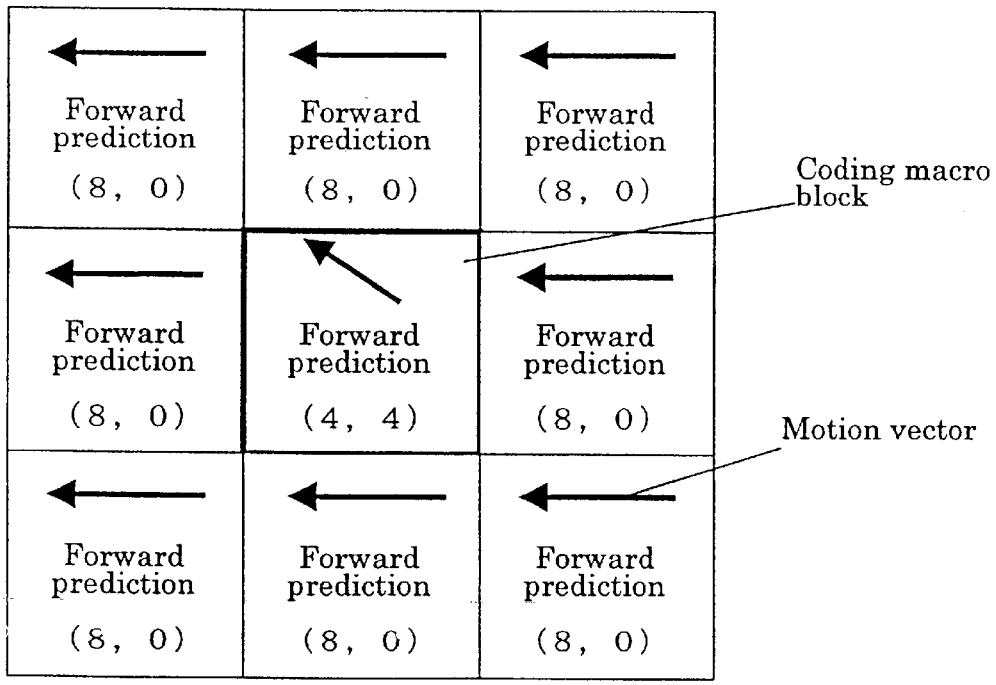
FIG. 14 shows motion vectors of a coding macro block and macro blocks around the coding macro block in a modification of the twentieth embodiment of the present invention.
Figure 16:
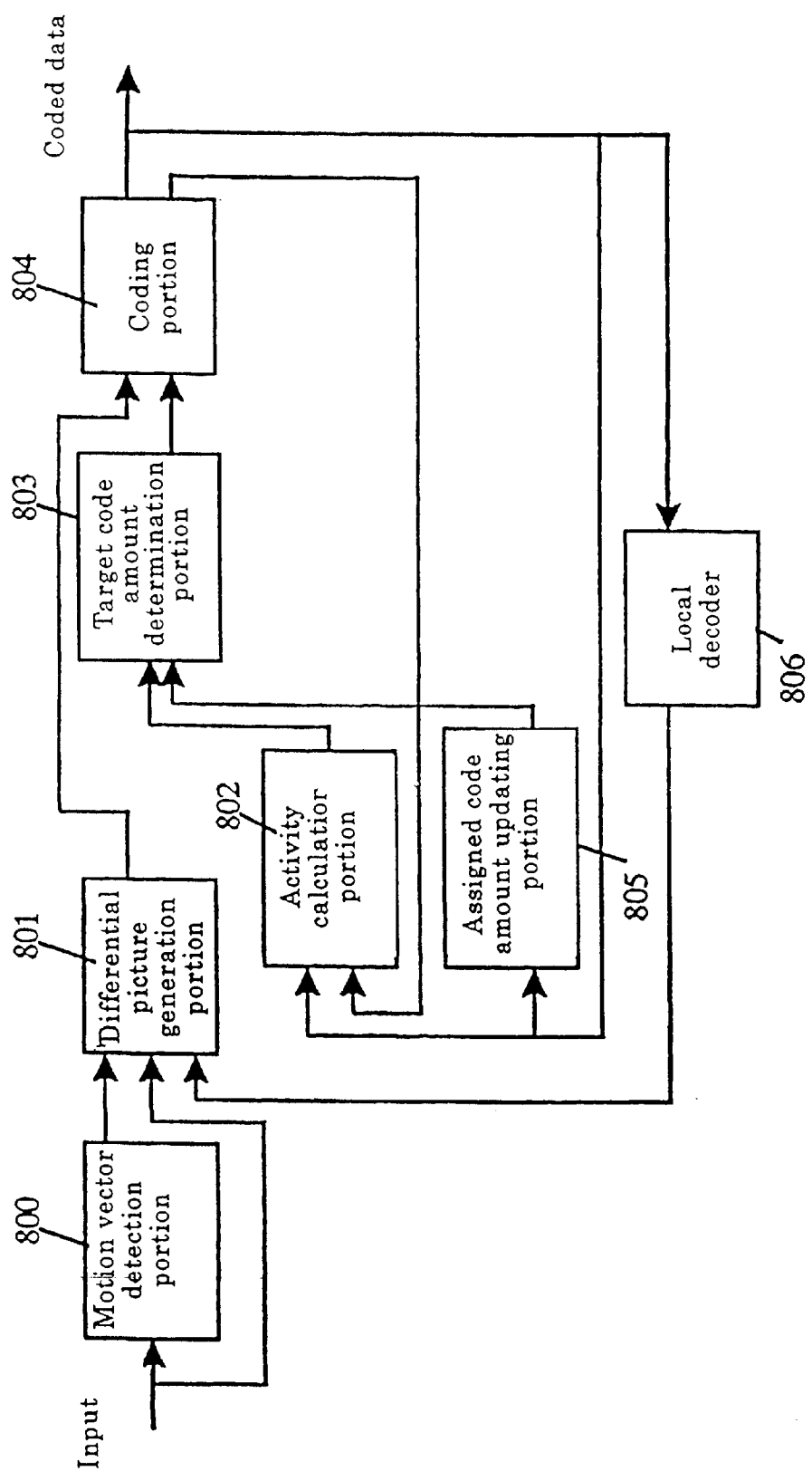
FIG. 16 is a block diagram of a conventional coding device using an intra-GOP interframe code amount control system.
Figure 17:
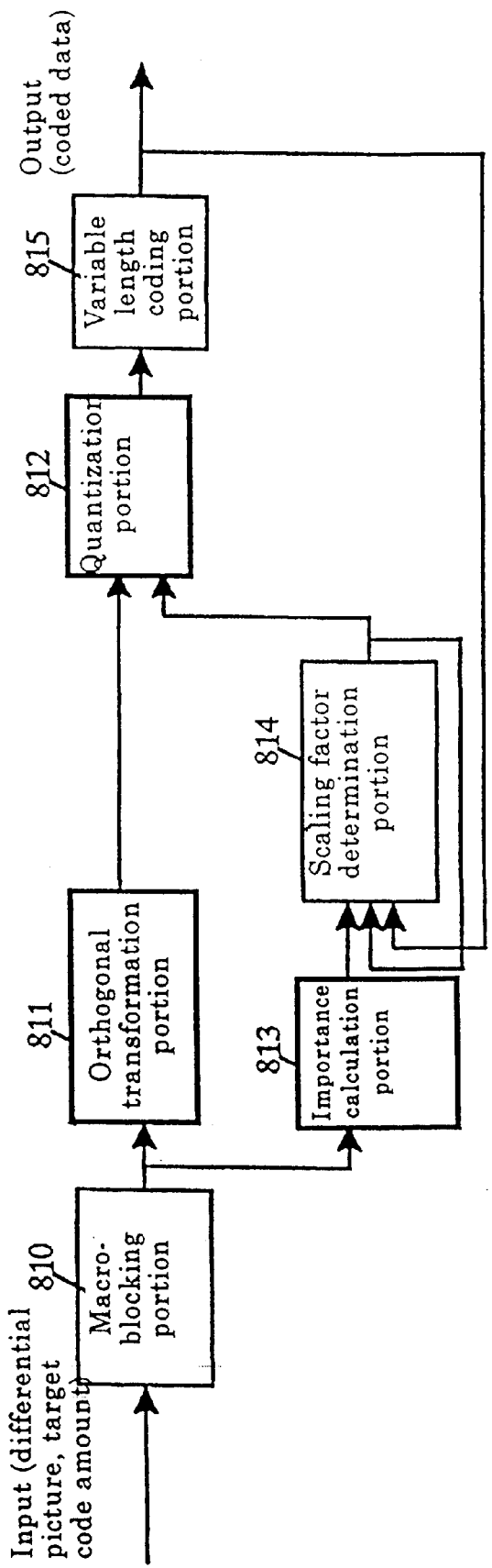
FIG. 17 is a block diagram of a conventional coding device using a feedback type intraframe inter-macro-block code amount control system.
Figure 18:
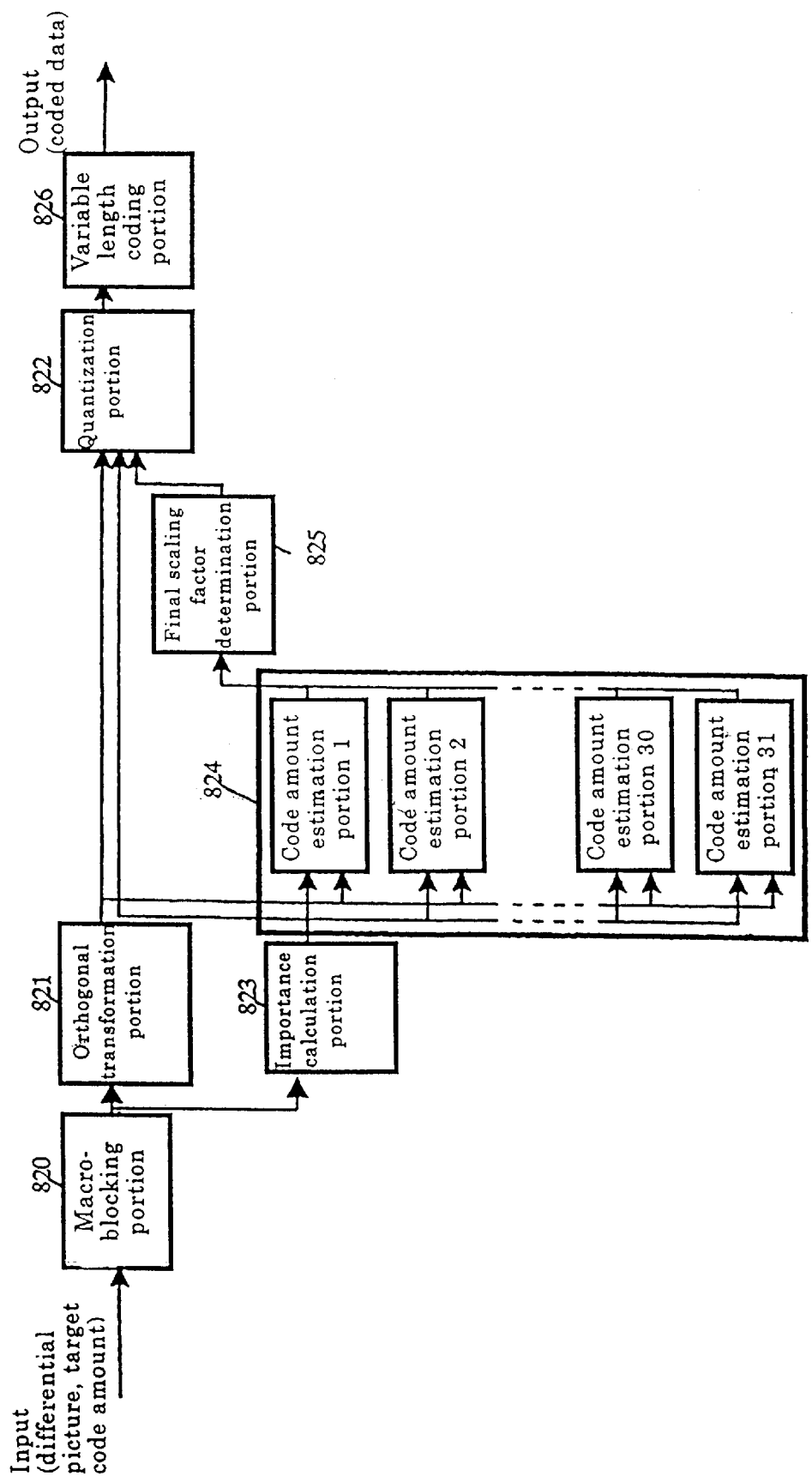
FIG. 18 is a block diagram of a conventional coding device using a feedforward type intraframe inter-macro-block code amount control system.

As shown in FIG. 14, the scaling factor can be controlled based on the quantity of the motion vector. FIG. 14 shows motion vectors when a picture to be encoded is a P picture. The motion vector of a coding macro block is (4,4) forward predictive, and the motion vectors of macro blocks around the coding macro block are (8,0) forward predictive. Here, (x,y) of a motion vector indicates motion in the horizontal direction by x samples and motion in the vertical direction by y samples.

When the sum of the absolute values of the differences between the motion vector of the coding macro block and the motion vectors of the macro blocks around the coding macro block is defined as a vector difference, the calculated vector difference is (|4−8|+|4−0|)×8=64. The calculated vector difference is larger than a threshold (for example, 32), so that the importance of the coding macro block is set high.

Thus, according to this embodiment, regions for a moving object and regions whose detected motion is large can be protected. Therefore, the code amount of the whole picture can be reduced to a constant value or less while restraining the deterioration of the picture quality.

Twenty-first Embodiment

A twenty-first embodiment of the present invention will be described with reference to FIG. 5. The configuration of FIG. 5 and the basic operation in this embodiment are the same as those in the ninth embodiment. However, this embodiment differs from the ninth embodiment in the following points.

The motion vector detection portion 300 forms a super block comprising a plurality of macro blocks including a coding macro block and detects a motion vector for each super block. For the convenience of explanation, a motion vector detected for each super block is referred to as a second vector, and a motion vector detected for each macro block is referred to as a first vector.

The importance calculation portion 303 calculates an importance with respect to a macro block. When the coding system of a picture to be encoded is an interframe coding system, the importance calculation portion 303 compares a first motion vector detected with respect to a coding macro block and a second motion vector detected with respect to a super block including the macro block, and sets the importance of the macro block high if the types of the vectors are different.

In addition, the importance calculation portion 303 calculates the sum of the absolute values of the difference between the first motion vector and the second motion vector, and sets the importance of this macro block high if the sum is larger than a threshold.

Thus, regions for a moving object and regions whose detected motion is large can be protected. Therefore, the code amount of the whole picture can be reduced to a constant value or less while restraining the deterioration of the picture quality.

Twenty-second Embodiment

A twenty-second embodiment of the present invention will be described with reference to FIG. 5. The configuration of FIG. 5 and the basic operation in this embodiment are the same as those in the ninth embodiment. However, the importance calculation portion 303 in this embodiment detects an importance for each of T orthogonal transformation blocks that belong to the same macro block, and defines the highest importance among the T importances as the importance of the macro block.

Thus, code amounts can be controlled with high precision according to the characteristics of pictures by detecting an importance for each orthogonal transformation block with respect to a coding frame and defining the highest of the importances of the orthogonal transformation blocks that belong to the same macro block as the importance of the macro block.

Furthermore, compared with the feedforward type intraframe inter-macro-block code amount control described as prior art, the coding device of this embodiment does not require a plurality of code amount pre-reading portions. Therefore, the coding device of this embodiment can be implemented with a smaller circuit. In other words, code amounts can be controlled with high precision according to the characteristics of pictures with a smaller circuit.

Twenty-third Embodiment

A twenty-third embodiment of the present invention will be described with reference to FIG. 5. The configuration of FIG. 5 and the basic operation in this embodiment are the same as those in the ninth embodiment. However, the importance calculation portion 303 in this embodiment detects an importance for each of T orthogonal transformation blocks that belong to the same macro block. If the importance calculation portion 303 determines that the importance is low, it sets the class of the orthogonal transformation block to 5. After the coding portion 307 sets all data of the class 5 orthogonal transformation blocks to 0 and sets the activities of the orthogonal transformation blocks to 0, the importance calculation portion 303 defines the highest of the importances of the orthogonal transformation blocks that belong to the same macro block as the importance of the macro block.

Thus, code amounts can be controlled with high precision according to the characteristics of pictures by detecting an importance for each orthogonal transformation block with respect to a coding frame, setting all data to 0 with respect to the orthogonal transformation blocks whose importance is determined as low, and defining the highest of the importances of the orthogonal transformation blocks that belong to the same macro block as the importance of the macro block.

Furthermore, compared with the feedforward type intraframe inter-macro-block code amount control described as prior art, the coding device of this embodiment does not require a plurality of code amount pre-reading portions. Therefore, the coding device of this embodiment can be implemented with a smaller circuit. In other words, code amounts can be controlled with high precision according to the characteristics of pictures with a smaller circuit.

What is claimed is:

1. A picture signal coding device comprising:

an importance calculation portion for detecting a visual importance for each macro block based on the absolute value level of an inputted picture and orthogonal transformation data in the case of intraframe encoding and based on the absolute value level of inputted pictures, orthogonal transformation data, differential picture and motion vector in the case of interframe encoding; and an activity function generation portion for calculating an activity for each macro block in each frame of the inputted pictures based on the differential picture and visual importance and, generating an activity function indicating an accumulation of the activity for each macro block in a coding frame, and calculating a frame activity of the coding frame;

a target code amount determination portion for determining a target code amount of the coding frame by using at least one of a remaining code amount at the time of coding the coding frame, a generated code amount of previously encoded frames, an activity of the previously encoded frames, an occupancy of a buffer, and the activity of the coding frame;

a reference scaling factor calculation portion for calculating a reference scaling factor of the coding frame by using at least one of a scaling factor of the previously encoded frames, the generated code amount of the previously encoded frames, the frame activity of the previously encoded frames, the frame activity of the coding frame, and the target code amount;

a coding portion for generating a prediction model based on the activity function and the target code amount, coding the coding frame macro block by macro block by using the prediction model, the reference scaling factor, and the importance, and generating encoded data.

* * * * *